United States Patent
Khokimovich et al.

(10) Patent No.: US 11,418,044 B1
(45) Date of Patent: Aug. 16, 2022

(54) METHOD AND APPARATUS FOR A BATTERY CHARGING STATION INFRASTRUCTURE INCLUDING INDIVIDUAL BATTERY CHARGERS

(71) Applicant: Juize Inc., Los Angeles, CA (US)

(72) Inventors: Mukhabbatov Nasim Khokimovich, Los Angeles, CA (US); Alex Freed, San Carlos, CA (US); John Mark Sutton, Murrieta, CA (US); Øivind Alexander Slaatto, Bronshoj (DK)

(73) Assignee: Juize, Inc., Los Angeles, CA (US)

( * ) Notice: Subject to any disclaimer, the term of this patent is extended or adjusted under 35 U.S.C. 154(b) by 296 days.

(21) Appl. No.: 16/742,906

(22) Filed: Jan. 14, 2020

Related U.S. Application Data

(60) Provisional application No. 62/792,369, filed on Jan. 14, 2019.

(51) Int. Cl.
| | |
|---|---|
| *H02J 7/00* | (2006.01) |
| *G06Q 20/32* | (2012.01) |
| *H04M 1/04* | (2006.01) |
| *G06Q 10/02* | (2012.01) |
| *H04L 67/306* | (2022.01) |

(52) U.S. Cl.
CPC ............ *H02J 7/0044* (2013.01); *G06Q 10/02* (2013.01); *G06Q 20/322* (2013.01); *H02J 7/0013* (2013.01); *H04L 67/306* (2013.01); *H04M 1/04* (2013.01)

(58) Field of Classification Search
USPC ............... 320/106, 107, 108, 109, 110, 112
See application file for complete search history.

(56) References Cited

U.S. PATENT DOCUMENTS

| | | | | |
|---|---|---|---|---|
| 7,143,065 | B1 * | 11/2006 | Enright | G06Q 20/1085 |
| | | | | 705/43 |
| 9,371,007 | B1 * | 6/2016 | Penilla | G06Q 20/145 |
| 2015/0294431 | A1 * | 10/2015 | Fiorucci | G07B 15/02 |
| | | | | 705/13 |
| 2017/0282736 | A1 * | 10/2017 | Goei | B60L 53/64 |
| 2018/0111494 | A1 * | 4/2018 | Penilla | B60L 53/68 |
| 2019/0255963 | A1 * | 8/2019 | Goei | B60L 53/68 |
| 2019/0351783 | A1 * | 11/2019 | Goei | B60L 53/68 |

FOREIGN PATENT DOCUMENTS

| | | | | |
|---|---|---|---|---|
| CN | 101577656 B | * | 10/2015 | |
| JP | 2003099675 A | * | 4/2003 | ........... G06Q 20/102 |
| JP | 2012048598 A | * | 3/2012 | |

* cited by examiner

*Primary Examiner* — Brian Ngo
(74) *Attorney, Agent, or Firm* — Nicholson De Vos Webster & Elliott LLP; Judith Szepesi

(57) ABSTRACT

A charger system comprising a charging station including a plurality of nests for chargers is described. Each of the plurality of nests is designed to partially eject the charger when instructed to do so, and further comprises a nest lock to lock in the charger into the nest when not ejecting. The charger system interacting with a user account, enabling a user to request the charger, wherein the charger is ejected from the nest for a valid request.

20 Claims, 40 Drawing Sheets

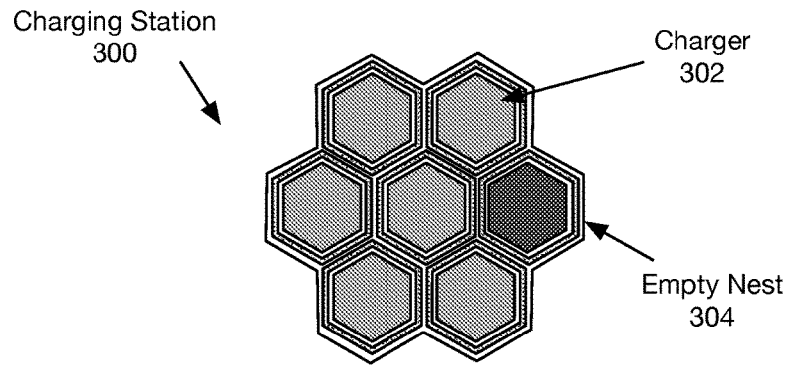
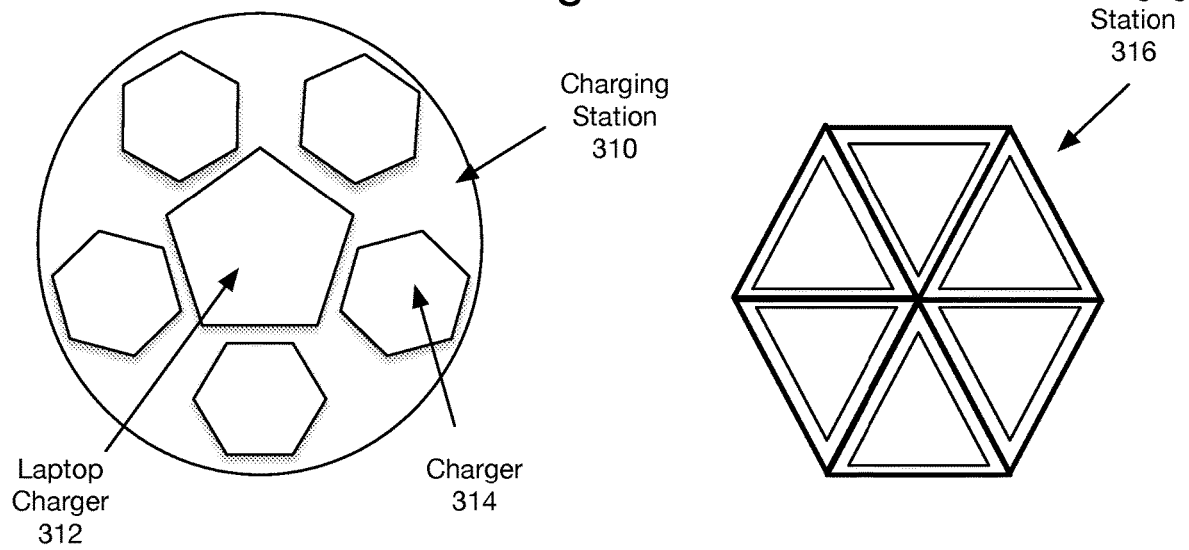
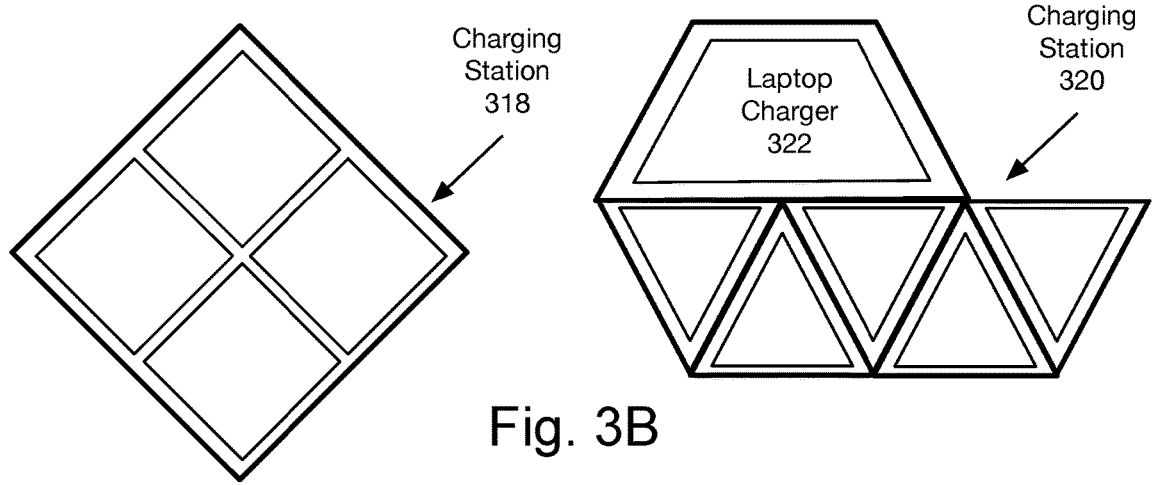

METHOD AND APPARATUS FOR A BATTERY CHARGING STATION INFRASTRUCTURE INCLUDING INDIVIDUAL BATTERY CHARGERS

RELATED APPLICATION

The present application claims priority to U.S. Provisional Patent Application No. 62/792,369 filed on Jan. 14, 2019, and incorporates that application in its entirety.

FIELD

The present application relates to battery chargers and in particular to battery charging stations, which dispense portable battery chargers.

BACKGROUND

As people become more mobile, carrying devices like cell phones and tablets with them wherever they go, the need for portable battery chargers increases. Generally, people have to carry their own portable battery chargers include a battery block and a cord to recharge their mobile devices. Some sites provide the ability to recharge your device. For example, for a short time, Starbucks™ Coffee Shops had built-in chargers in their tables. However, that has a high cost in setup and maintenance. You also either have too many charging capable tables, or not enough. It is very difficult to get the correct number of charging facilities in the correct locations.

BRIEF DESCRIPTION OF THE FIGURES

The present invention is illustrated by way of example, and not by way of limitation, in the figures of the accompanying drawings and in which like reference numerals refer to similar elements and in which:

FIGS. 3A-3H illustrates embodiments of a charging station in various configurations.

DETAILED DESCRIPTION

A charging station ecosystem is described in which charging stations can dispense chargers, that may be used and subsequently returned to any charging station. The system includes indoor and outdoor charging stations, a subscription model, and the ability to lock chargers into a charging station disabled, until a removal is authorized, when the charger is ejected. In one embodiment, a charging station includes a plurality of nests. In some embodiments, each nest has an "extrude" or "partially eject" option where the charger is pushed partially out of the nest for easy removal by a user. In one embodiment, for outdoor charging stations, there is a single door through which the outdoor charging station dispenses chargers.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional and other changes may be made without departing from the scope of the present invention. The following detailed description is, therefore, not to be taken in a limiting sense, and the scope of the present invention is defined only by the appended claims.

Figure 1:
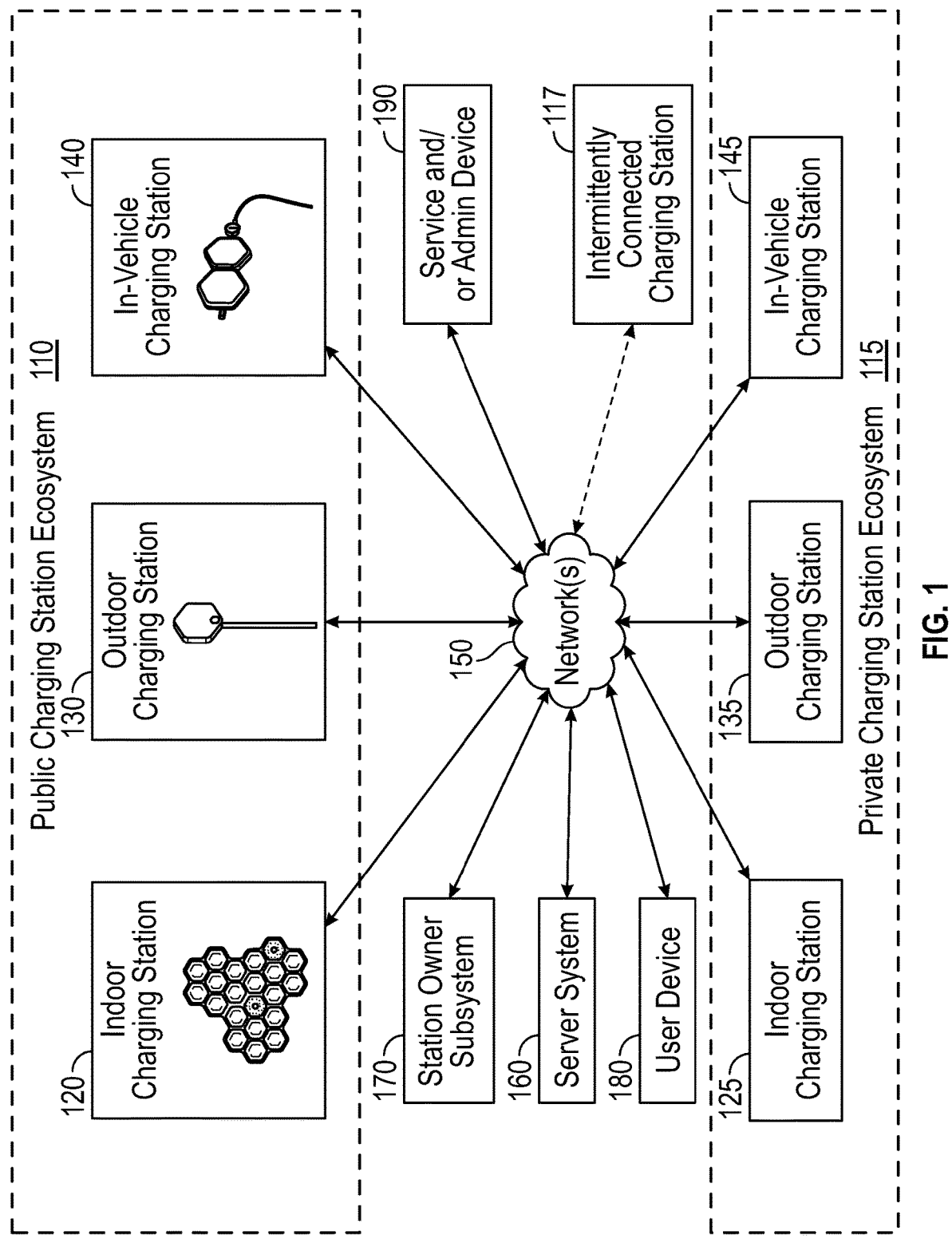
FIG. 1 is a block diagram showing one embodiment of the elements of the system.

FIG. 1 is a block diagram showing one embodiment of the elements of the system. A public charging station ecosystem 110 may include one or more an indoor charging stations 120, an outdoor charging stations, and one or more in-vehicle charging stations 140.

An indoor charging station 120 in one embodiment includes a plurality of nests into which individual chargers fit. In one embodiment, each individual indoor charging station includes a configuration of seven chargers of the same size, arranged in a flower form. This shape makes it easy to expand a charging station setup to include multiple charging stations, which together form any of a variety of pleasing shapes. Of course, alternative shapes and configurations for the charging station may be used. An indoor charging station setup 120 may include a plurality of individual charging stations. In another embodiment, the charging station may include a variety of different charger shapes and/or capabilities. For example, a charging station may include a larger charger for laptops, or different chargers with different types of connectors. Indoor charging stations 120 have unique charging station IDs. In one embodiment, the indoor charging station 120s are coupled to a wireless network, and interact with the user through an application on the user's mobile device. In one embodiment, the wireless network 150 may be a cellular network.

Outdoor charging stations 130 in one embodiment are designed to be fully enclosed with an openable door through which a charger is dispensed. In one embodiment, the outdoor charging stations 130 may use solar energy for recharging. The outdoor charging stations in one embodiment also have unique charging station IDs. In one embodiment, the outdoor charging stations are coupled to a wireless network, and interact with the user through an application on the user's mobile device. In one embodiment, the wireless network 150 may be a cellular network.

In-vehicle charging stations 140 in one embodiment are designed to be used in a vehicle, and attached to the vehicle. The attachment may use a vent clip, a suction cup, tape, or another method of securing the in-vehicle charging station to the car. A charger is coupled to the in-vehicle charging station. In one embodiment, the attachment of the charger is magnetic. In one embodiment, the in-vehicle charging station also is coupled to a wireless network 150, and interact with the user through a web page or an application on the user's mobile device. In one embodiment, the wireless network 150 may be a cellular network. In one embodiment, the in-vehicle charging station may couple to the network either directly or through a mobile device, such as the driver's mobile device. In one embodiment, in-vehicle charging stations may be designed to accept multiple chargers, such as a trio in-vehicle charging station. This design may be useful for drivers who provide taxi services or similar cases where the vehicle is likely to see a lot of users. In one embodiment, trio in-vehicle charging stations are attached to a vent, using suction cups, tape, glue or attachment mechanisms.

In one embodiment, the chargers used by each kind of charging station 120, 130, 140 are compatible. In one embodiment, they are identical.

The combination of charging stations form a charging station ecosystem 110. The system, in one embodiment is designed to provide a plurality of locations from where a user may take a charger, and a plurality of locations to which a charger may be returned.

In one embodiment, there are public charging system ecosystems 110 which may include one or more of indoor, outdoor, and car charging stations. Public charging stations are available to anyone who utilize a website, web application, or downloadable application to obtain a charger.

In addition to public charging system ecosystems 110, in one embodiment there may also be private charging station ecosystems 115, which may include one or more of indoor charging stations 125, outdoor charging stations 135, and in-vehicle charging stations 145. Private charging stations are only available to members of a group who are affiliated with the private charging station. A private charging station may be owned by an individual, an organization such as a corporation or university, etc. In one embodiment, private charging stations 115 may be branded to visually make it clear that a charger removed from a private charging station cannot be returned to a public charging station. In one embodiment, if a user attempts to return a private charging station charger to a public charging station, or to an unrelated private charging station, the system would reject the charger, and the user would receive a message that private chargers can only be returned to the associated private charging station(s). In one embodiment, private charging station chargers may be physically differentiated, so that a charger removed from a private charging station cannot be returned to a public charging station.

In one embodiment, there may additionally be intermittently connected charging stations 117. Intermittently connected charging stations 117 are designed to operate when they are not in contact with the server 160. In general, as will be described below, charging stations 110, 115 are enabled by commands from a server system 160. However, in one embodiment some charging stations may be capable of operating when intermittently connected to power. Such charging stations 117 would include memory to store the transactions completed, and would upload such transaction data when connected. In one embodiment, such charging stations 117 request access to the network of a mobile device (e.g. a phone being charged) and utilize that network to complete transactions. In one embodiment, some intermittently connected charging stations 117 are capable of being stand-alone systems with sufficient computing power to complete transactions with users, including charging credit cards, etc. Some of the processes for such intermittently connected charging stations are described below with respect to FIG. 9B.

In one embodiment, each charger and each charging station has a unique identifier. In one embodiment, the unique identifier may be a QR code or bar code on the back of the charger, and charging station. In another embodiment, the unique ID may be an NFC (near field communication) or RFID (radio frequency identification) tag. The unique IDs may be a mix of bar codes, QR codes, RFID tags, NFC tags, or other methods of providing an accessible unique ID for each device—charging station and chargers.

The charging stations 120, 125, 130, 135, 140, 145 in one embodiment communicate via a network 150. In one embodiment, charging stations communicate via wireless communication such as Wi-Fi, cellular network, wired connection to a network, or other communication method.

In one embodiment, server system 160 controls the charging stations, and enables the charging station to release chargers to a user, and enables a user to return chargers to a charging station. In one embodiment, server system 160 may include one or more server computer systems. In one embodiment, server computer system 160 may be a distributed or cloud based system in which the server-processes are implemented by various devices.

Server 160 collects data from the public and private charging station ecosystems 110, 115. This data may be analyzed and provided to venues, for example suggesting rearrangement of the charging stations within an organization based on usage pattern. Additionally, because data is collected about user patterns, the system may also be able to recommend additional venues for new installations. Furthermore, because the system utilizes the rechargeable batteries in the chargers, the server 160 may collect and analyze battery usage and capability data. This information, in one embodiment is used to ensure that chargers remain in use, and are optimally cycled through charge and discharge cycles for efficient and long life. This information, in one embodiment, may be provided to battery manufacturers.

User device 180 accesses the server system 160 via a website, a web application, or a downloadable application. The user device 180 may be used, once an account has been set up, to obtain charging stations temporarily to recharge the mobile device (or other devices). The user device 180 may be a cellular phone, tablet, laptop computer, or another device which can utilize an application or website, and connect to the Internet directly or through an intermediary.

In one embodiment, a station owners' subsystem 170 enables companies and/or individuals who host or operate one or more charging stations, whether public or private, to obtain data about their stations, and its use.

Service and/or admin devices 190 may enable an administrator or repairer to service a charging station. As noted, user devices may be used to obtain chargers from a station. In one embodiment, user device 180 may run an application associated with the system. In one embodiment, the user device 180 may access the service through a website, or by scanning the QR code/barcode or other unique identifier of a charging station.

Figure 2:
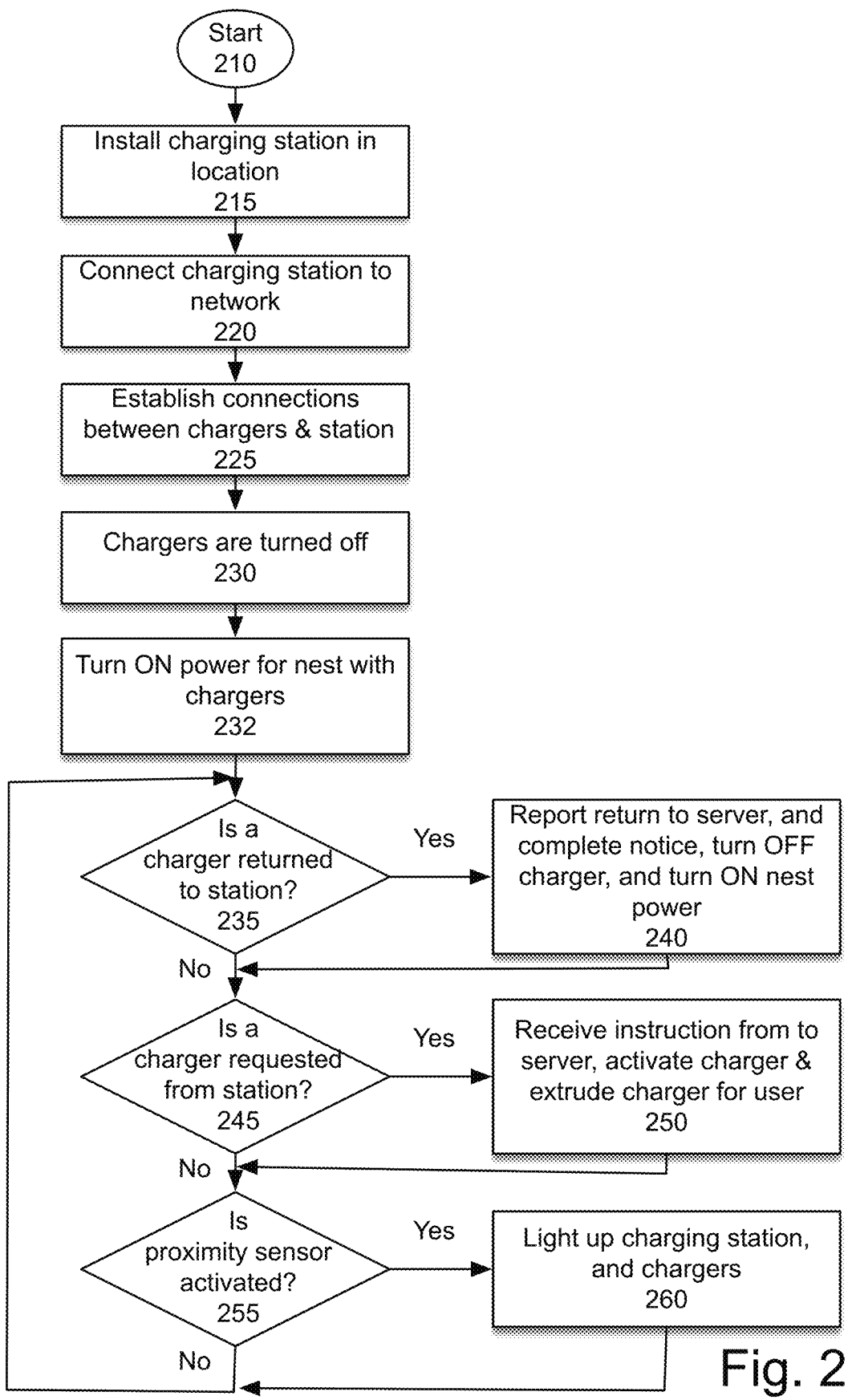
FIG. 2 is an overview flowchart of the functioning of a charging station.

FIG. 2 is an overview flowchart of the functioning of a charging station. The process starts at block 210.

At block 215, the charging station is installed in the location. In one embodiment, a sign-up process, described below is used prior to installation. In one embodiment installation may install one or more charging stations as a "group." The group of charging stations communicate together with the server, and are used as a single unit, in one embodiment.

At block 220, the charging station is connected to a network. In one embodiment, the network is the Internet, and the connection is via a cellular network, a wireless network, or a wired network. In one embodiment, the installation includes a router or other communications element. In one embodiment, each charging station includes a cellular communications chip, enabling the charging station to communicate over cellular networks. This removes the need for the location to provide network. In one embodiment, in a charging station setup including multiple charging stations, only one charging station needs to have a cellular communications chip.

At block 225, connections are established between the chargers in the charging station, and the charging station. In one embodiment, after physical installation of the charging station, the chargers are inserted into the individual nests of the charging station, for an indoor charging station type. For an outdoor charging station, each charger is inserted through an insertion door, one at a time.

Establishing connection between the charger and the charging station in one embodiment includes obtaining a charger ID, and a charger state for each charger. The charger state for each charger includes the charger state, which is the capacity of the battery as a percent, the temperature of the battery, voltage level, and charging status (e.g. charging, fully charged, not charging).

At block 230, the chargers are turned off. A turned off charger can take on charge but cannot output any power. It is effectively not useable until activated. In one embodiment, a charger is turned off via a command sent by the charging station, to the charger's CPU. The command disconnects the discharge path for the charger. In one embodiment, the system uses a software control to turn off the chargers. In one embodiment, a mechanical element is used to turn off the charger.

At block 232, power to any filled nests is turned on. In one embodiment, when a nest has no charger in it, it is by default OFF. This decreases the power consumption of the charger station, and is useful for power efficiency. In one embodiment, power may also be turned off for nests that are fully charged. In one embodiment, when power is limited, for example when a site has power use restrictions, the system may selectively charge a few chargers at a time, turning off the other nests. In one embodiment, when power is limited, the nests of chargers which are sufficiently charged, are turned off.

At block 235, the process determines whether a charger has been returned to the charging station. If so, the return is reported to the server, along with a status report about the charger. The charger is then turned off. The server also closes the session with the user's account. If the charger state and the connection between the nest and the charger is verified by the server, the power to the nest is then turned on, initiating charging.

At block 245, the process determines whether a charger has been requested from the charging station. The user's system communicates with the server, therefore the charging station receives the instruction from the server that a charger has been requested, after the request is validated. That is, the charging station is not informed in one embodiment until after the user's account has been set up/validated, and the request is ready to be fulfilled. At that point, the charger is instructed to activate the selected charger, and extrude the selected charger for the user.

At block 255, the process determines whether the proximity sensors is activated, in one embodiment. In one embodiment, the proximity sensor is activated when a user waves a hand in front of the charging station, or gets within a certain distance of the charging station. If the proximity sensor is activated, at block 260 the charging station and chargers are lit up. In one embodiment, the lighting varies based on proximity to the charging station. In one embodiment, the lighting implements a "breathing" type pattern where the lights get brighter and dimmer in a slow pattern. The timing of this pattern is arbitrary. In one embodiment, the "breathing" type light pattern has an approximate timing aligned with normal breathing, e.g. getting brighter for 1-2 seconds slowly, holding for 0.5-1 second, and then dimming slowly for 1-2 seconds, and then holding for 0.5-2 seconds.

The process then returns to block 235, to continue monitoring for new returns, requests, or proximity experiences.

FIGS. 3A-3B illustrate embodiments of a charging station. FIG. 3A illustrates one embodiment of a charging station 300 which includes seven identically sized chargers 302 positioned in a symmetric configuration of nests. The exemplary configuration shown in FIG. 3A is a flower shape, in which seven equally sized hexagonal chargers 302 are within a charging station 300. In this illustration, one nest 304 is empty.

FIG. 3B illustrates some alternative embodiments of the charging station 310, 316, 318, 320. Charging station 310 illustrates a configuration in which five identically sized chargers 314 surround one larger charger 312. In one embodiment, this configuration shows one way in which a laptop charger, or another type of charger may be incorporated into the charging station 310. Charging station 316 shows an alternative charger shape of triangles. Charging station 318, shows an alternative charger shape of squares. Charging station 320 shows an alternative charger shape of triangles for smaller chargers, and a larger laptop charger having a trapezoidal shape. In one embodiment, each of the configurations is designed to be expandable, so a set of charging stations can together form an interesting shape. However, this is not a requirement of the system. The shape of the charging station, and the shapes of the individual chargers are not limited by those illustrated here. One of skill in the art would understand that the shapes of both the chargers and charging stations are arbitrary. Thus, alternative shapes or sizes may be used, without departing from the scope of the invention.

Figure 3D:
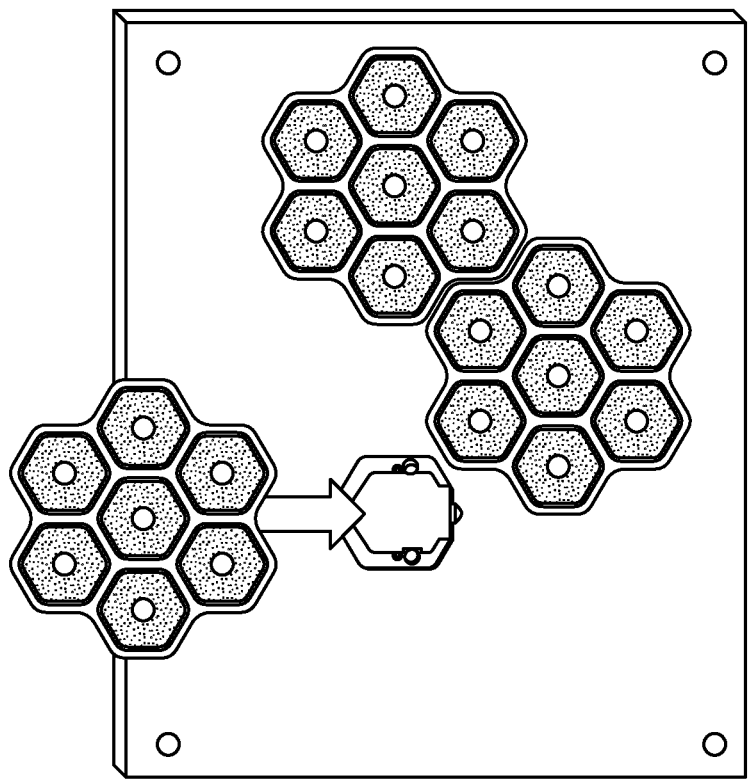
Figure 3C:
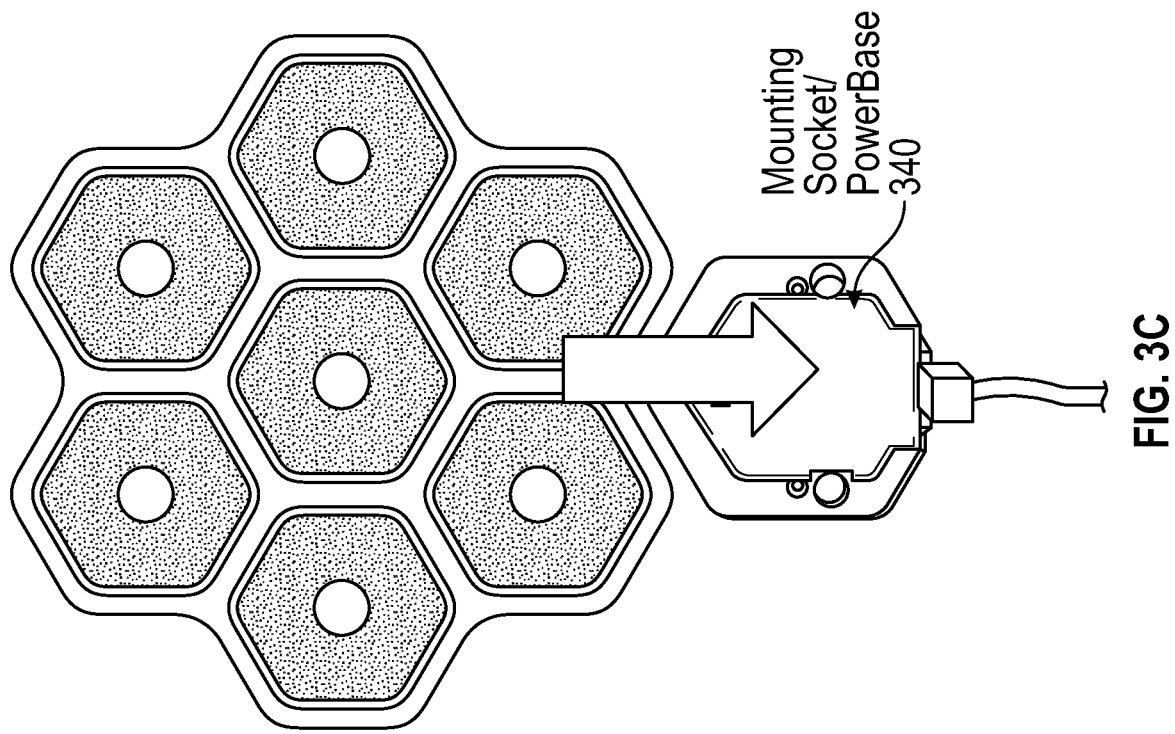

FIG. 3C illustrates one embodiment of a charger attached to a wall, using a mounting socket power base 340. The mounting socket power base 340, in one embodiment, is attached to a wall or other structure to provide support. The mounting socket power base 340 also provides the network and power connection for the charging station, in one embodiment. The mounting socket power base 340 can be initially installed in a position, and then the charging station is inserted onto the mounting socket power base 340, as shown in FIG. 3D. In one embodiment, multiple mounting sockets may be mounted to enable a set of charging stations to be placed together. In one embodiment, the design is such that the mounting socket power base 340 can be installed for all charging stations, before inserting any charging stations.

Figure 3E:
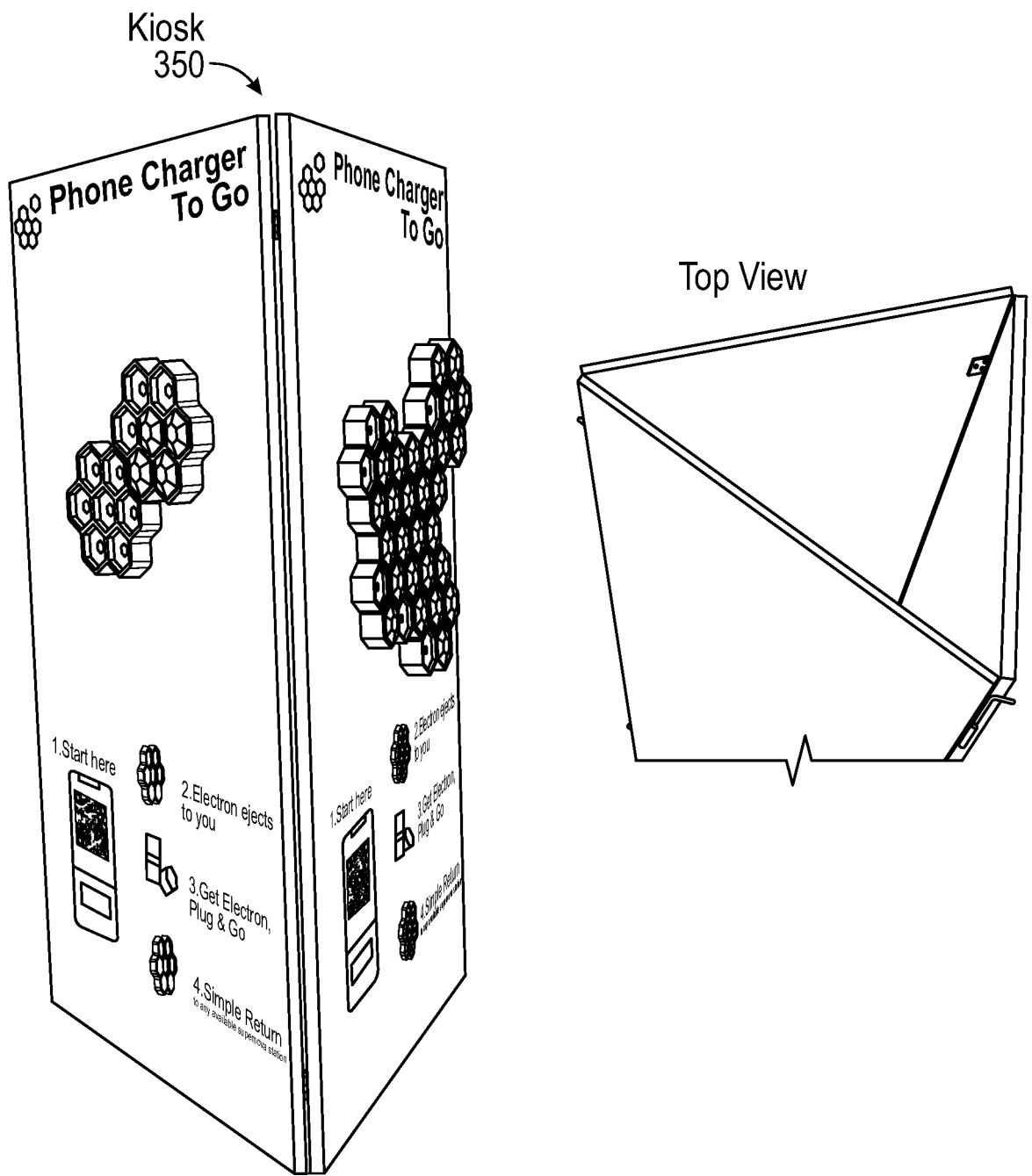

FIG. 3E illustrates a kiosk 350 onto which one or more charging stations may be mounted. As can be seen in the top view, the kiosk in one embodiment is a triangular prism, in which each side may have one or more charging stations. The electronics and connections are in the center of the kiosk 350. In this illustration, two of the three sides of the kiosk 350 are shown with charging stations. One of the sides illustrates two charging stations, and one illustrates five. Any number of charging stations may be mounted on a kiosk 350. In one embodiment, all of the charging stations mounted to a kiosk may serve as a single group, coupled together in the kiosk center. Alternatively, each side may be a separate group.

Figure 3G:
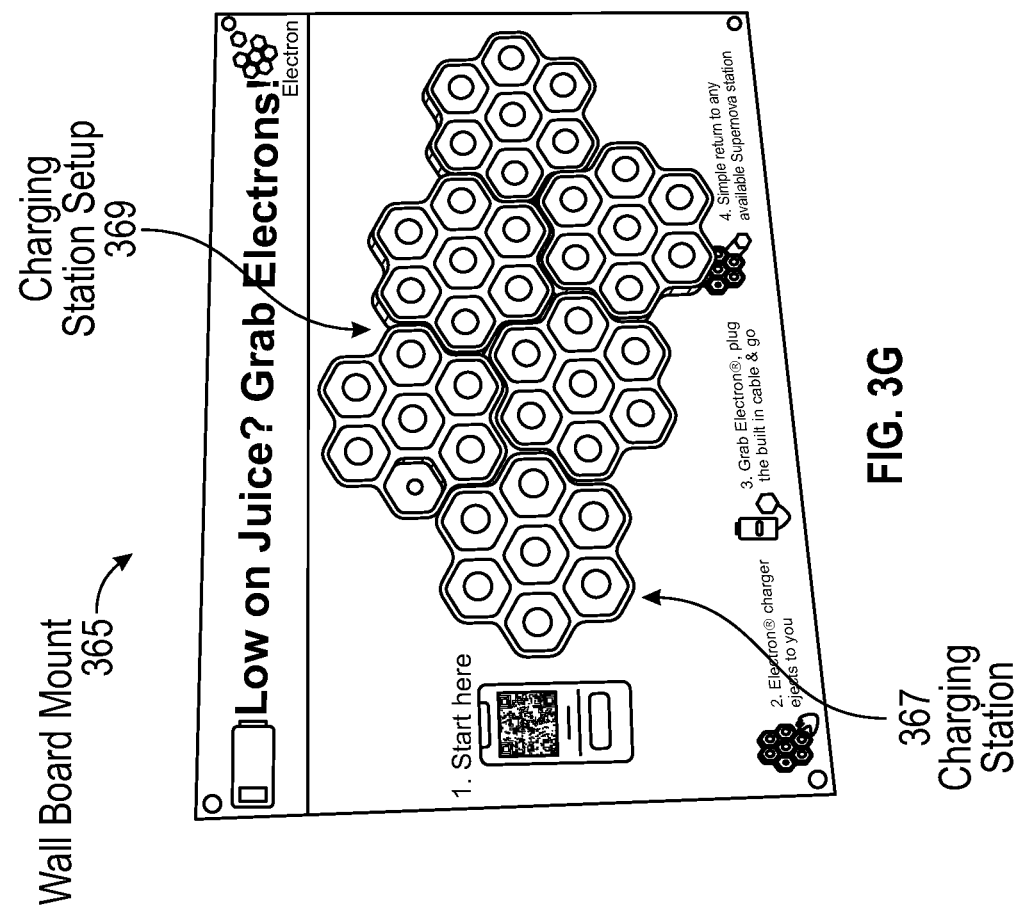
Figure 3F:
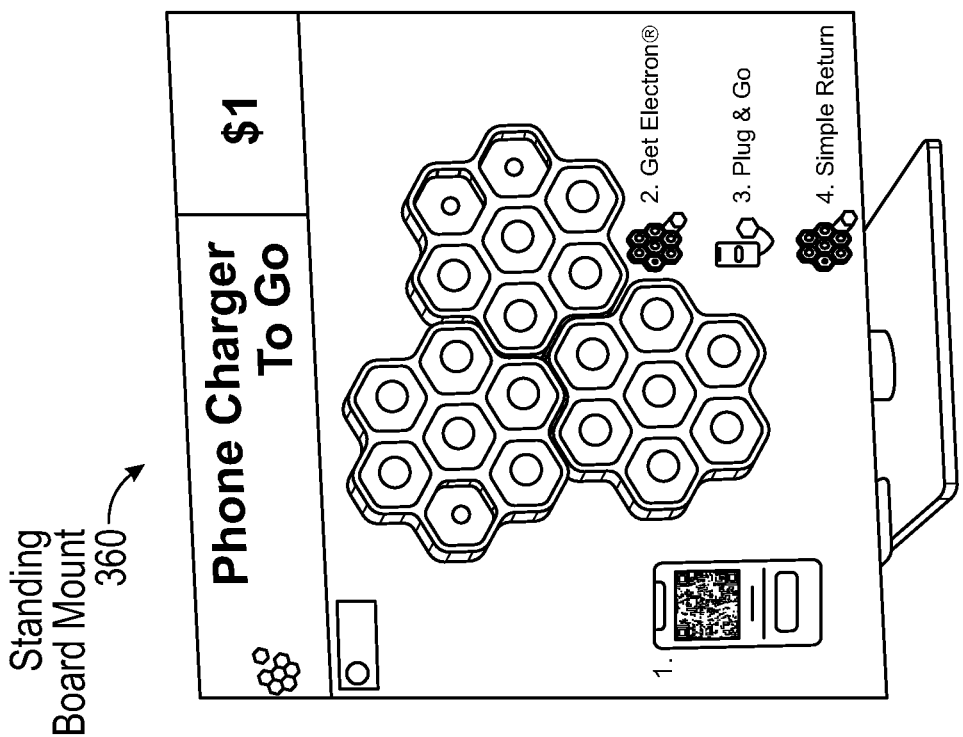

FIG. 3F illustrates one embodiment of a charging station setup mounted on a board. The board 360 may be a standing board mount 360, supported by a stand, as shown. In another embodiment, shown in FIG. 3G, the board may be a wall board mount 365, designed to be mounted on the wall. FIG. 3G illustrates a set of six charging stations 367, together forming a charging station setup 369. By mounting the charger station on a board 360, 365, rather than directly on the wall, in one embodiment moving the charger stations becomes easier. It also provides a simpler way to hide the network and power connections, rather than requiring in-wall wiring.

Figure 3H:
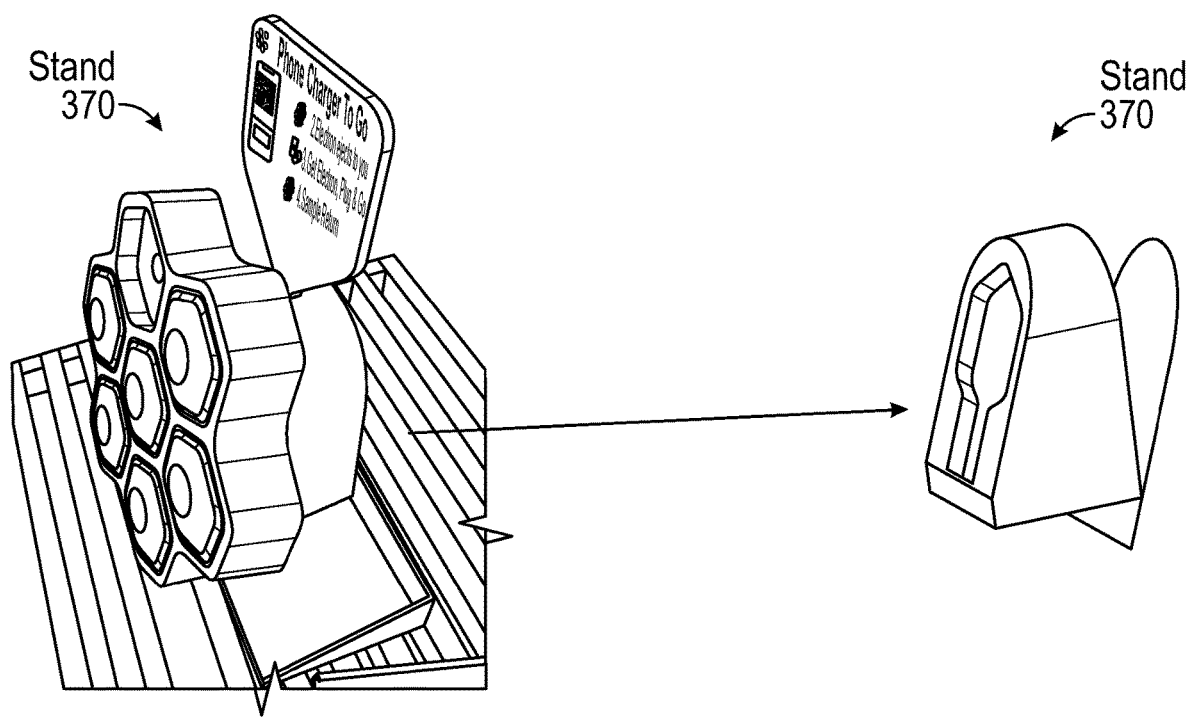

FIG. 3H illustrates another embodiment of a stand for a charging station. The stand is designed to stably support a single charging station. Unlike the kiosk and the board mounted charging stations, in one embodiment, the stand 370 does not have the mounting socket attached to a flat surface. Rather, the mounting socket is mounted into a tabletop mount which may be fixed to a horizontal surface.

Figure 3I:
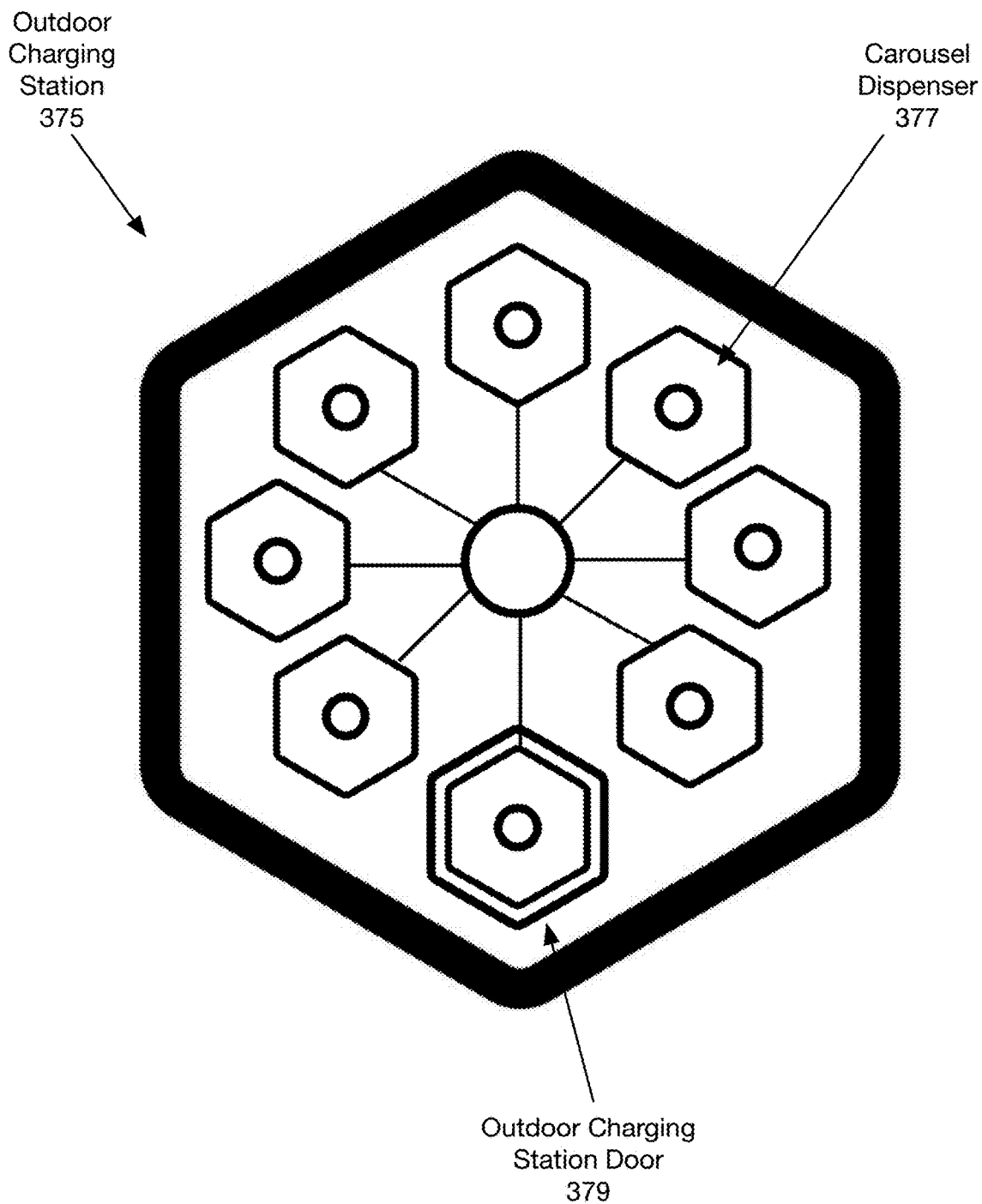
FIG. 3I illustrates one embodiment of an outdoor charging station showing a carousel dispensing element.
Figure 3J:
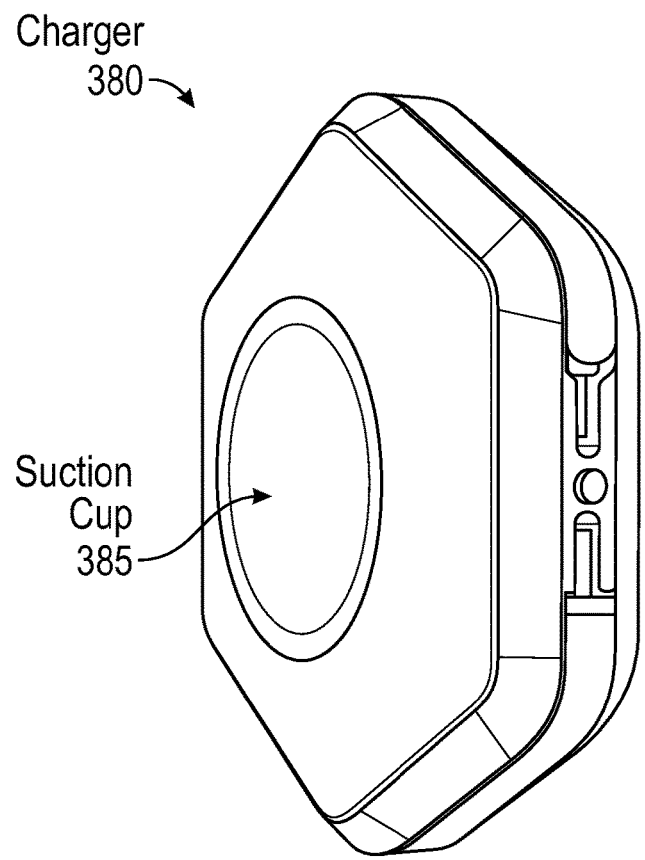
FIG. 3J-3M illustrate embodiments of a charger.
Figure 3K:
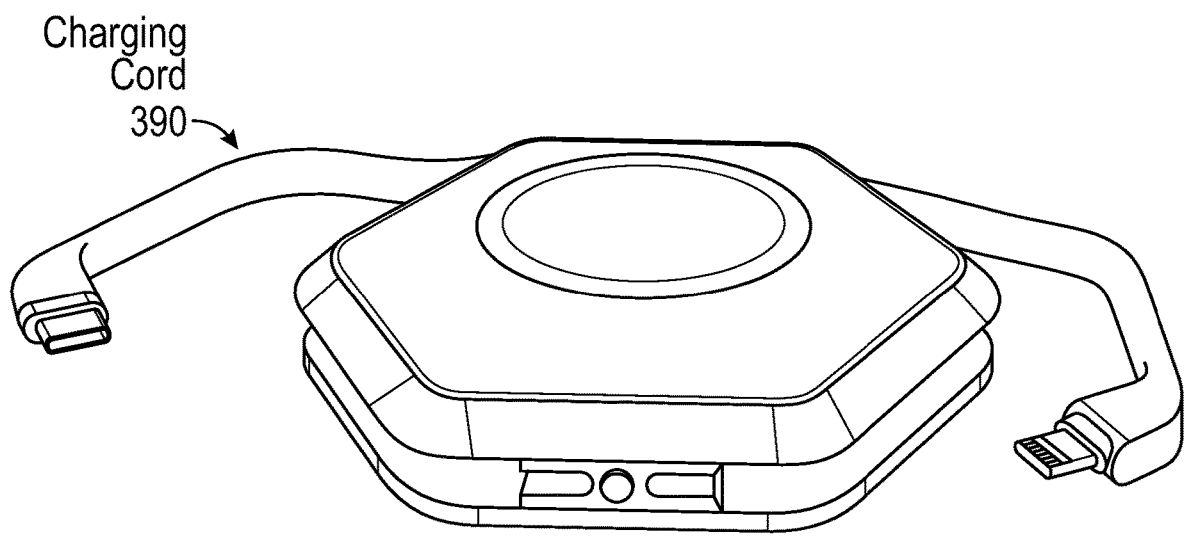

FIG. 3I illustrates one embodiment of a "see-through" illustration of an exemplary outdoor charger. In one embodiment, the outdoor charger has six nests mounted in a circle, on a carousel type mount, which can rotate within the enclosed outdoor charging station 375. When a charger is requested, the outdoor charging station 375 identifies the appropriate charger to dispense, in one embodiment, based on charging level. The outdoor charging station then rotates the carousel dispenser, until the nest is aligned with the charging station door 379. The nest then partially ejects the charger, through the door 379. In this way, the outdoor charging station can protect the charging station and nests and chargers from the elements, while providing chargers on demand. In one embodiment, the outdoor charging station door 379 may be a door which is closed when the outdoor charging station is not in use, and is opened only to dispense a charger. In some embodiments, the outdoor charging station 375 may have some lights such as LEDs mounted on the inside of the translucent casing, such that the outdoor charging station 375 may also provide visual feedback of dispensing and accepting chargers, as described with respect to the indoor charging station. In another embodiment, the mechanism within outdoor charging station may be a rollers moving a charger to the door for dispensing. In another embodiment, the mechanism within the outdoor charging station may be a conveyor belt for moving the chargers. In one embodiment, the outdoor charging station 375 may have a solar panel. The solar panel can provide a portion of the power used by the charging station 375, and in emergencies can provide backup power.

FIG. 3J-3M illustrate embodiments of a charger. The charger in one embodiment has a hexagonal shape with a suction cup 385 on its top surface. The back of the charger is designed to fit into the nest of a charging station, and receive power. In one embodiment, the charger 380 incorporates one or more charging cords 390. This means that a user does not need to have a charging cord available to use the charger. The charging cord fits into the body of the charger, when the charger is not in use. In one embodiment, the charger 380 may also provide inductive charging capabilities.

Figure 3L:
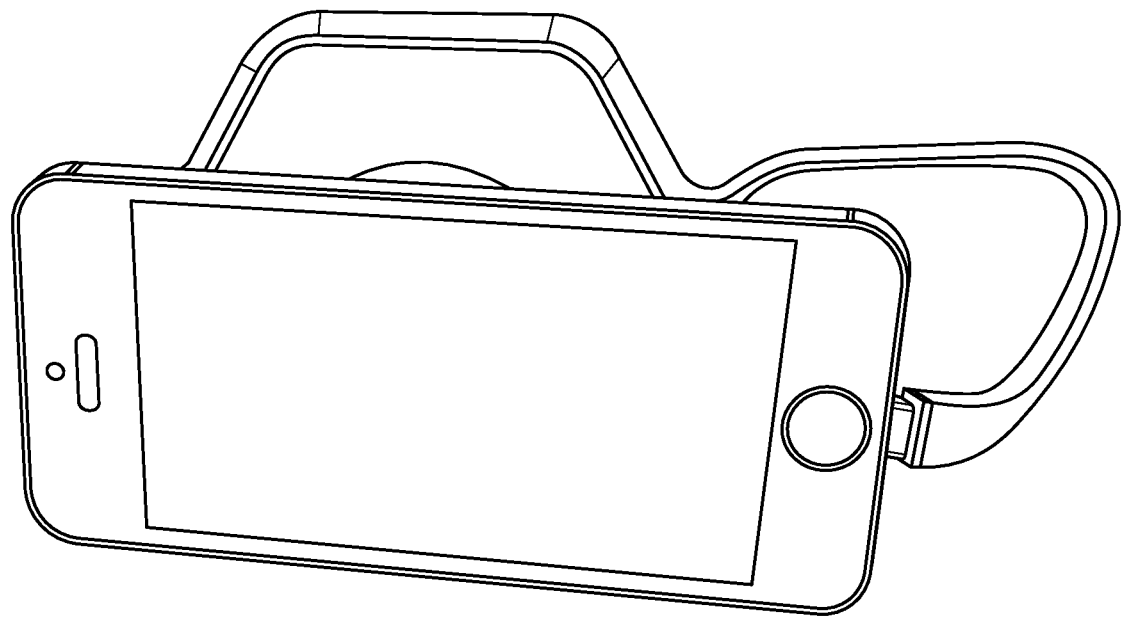

Because the suction cup is stable, and the shape of the charger is regular, in one embodiment, the charger 380 may be used as a kickstand for the phone, while the charger is in use. FIG. 3L illustrates this use. This also means that the user can pick up their phone, without having to be concerned about the charger being dislodged, or the cord being damaged.

Figure 3M:
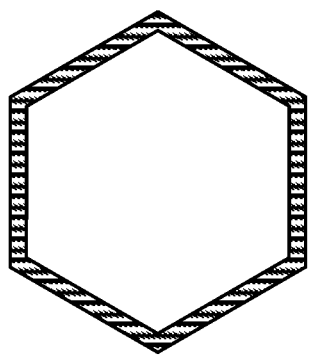
Figure 3M:
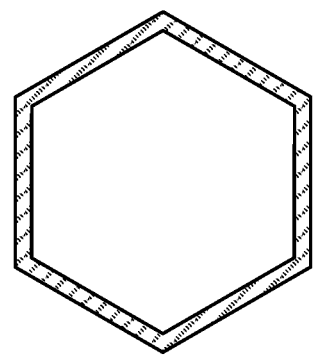
Figure 3M:
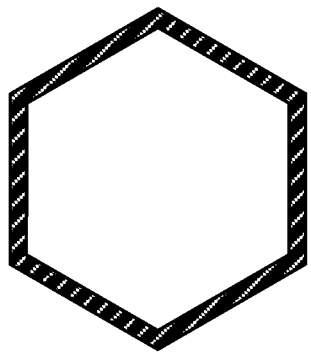
Figure 3M:
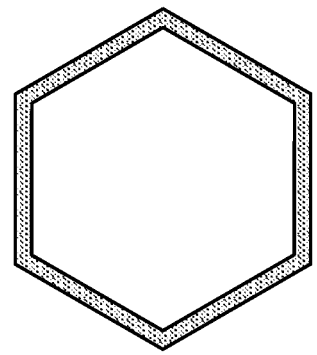

FIG. 3M one embodiment of a charger, with edge color options. In one embodiment, edge colors may be various colors of plastic, used to differentiate chargers from various private charging stations. In one embodiment, the charger frame is transparent, and the charger includes around its edge a number of RGB LEDs, as shown. In one embodiment, six or more RGB LEDs are distributed along the edge of the charger. The RGB LEDs enable the charger to light up in various colors.

Figure 4:
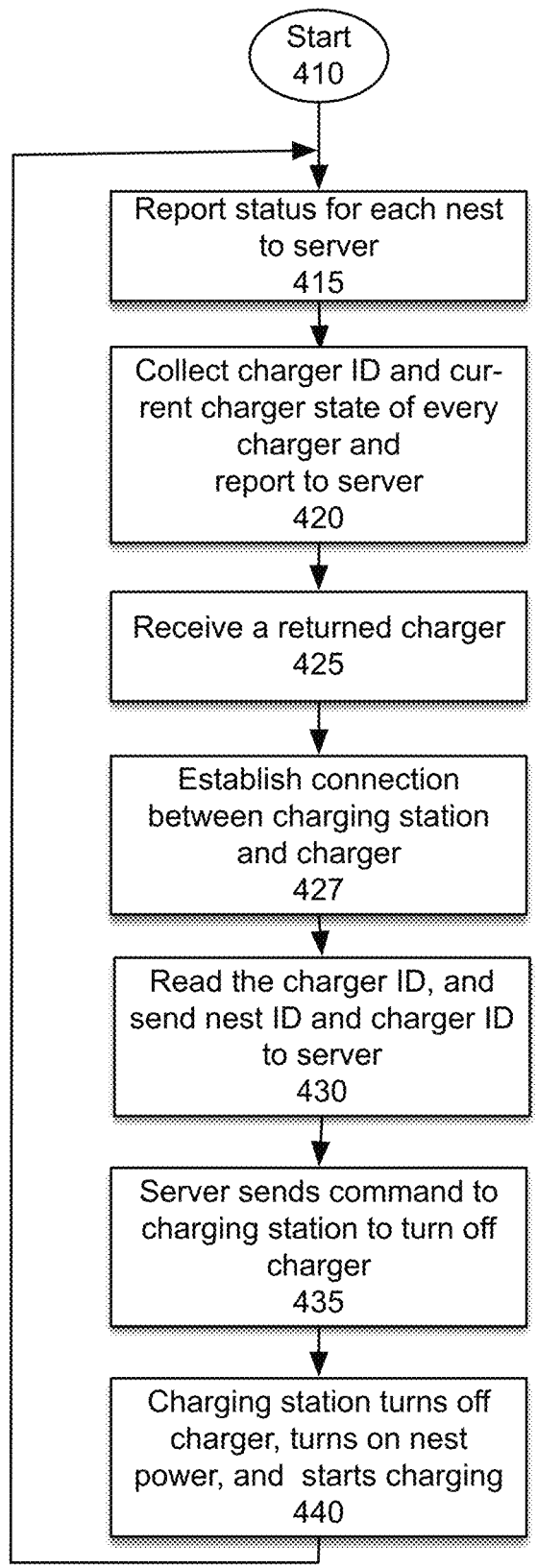
FIG. 4 is a flowchart of one embodiment of reporting from the charging station to a server.

FIG. 4 is a flowchart of one embodiment of reporting from the charging station to a server. The process starts at block 410.

At block 415, the charging station reports the status for each nest to the server. The status includes whether the nest is empty or filled.

At block 420, the charging station polls each charger to obtain the charger ID and the current charger state. The current charger state in one embodiment includes the state of charge, voltage level, the status of charging (charging, fast charging, not charging, fully charged), and the temperature of the battery, as well as any detected faults. In one embodiment, the current charger state provides enough information to evaluate the battery status in the charger. Batteries can be recharged fully between 400 and 1200 cycles. Over time, the typical battery will take on less charge, and will discharge less completely. The system, through this polling mechanism keeps track of the state of each battery. This data is sent to the server, with charger ID and nest ID for each charger.

At block 425, a returned charger is received by the charging station. At block 427, a connection is established between the charging station and the charger. In one embodiment, the connection is via a conductive wireless charging and data sync technology with a magnetic connection capability. In one embodiment, the Magconn™ connector system by may be used. In one embodiment, the connection may be a separate power connection and data connection. In one embodiment, the data connection may be a wireless connection.

At block 430, the charger ID is read and the nest ID where the charger was returned, and the charger ID are sent to the server. Then the charging station sends the nest ID and charger ID to the server. This enables the server to identify the user who previously had the charger, and close the session, and complete billing/tracking data.

At block 435, the server sends a command to turn off the charger. In another embodiment, this may be done by the charging station, without a server command. A turned off charger cannot be used until it is activated again. In one embodiment, the charger is turned off via a software command, which can only be received by radio command from the charging station or by wireless touch connection from the charging station. This means that a charger that is turned off is not usable. If someone manages to remove a charger from a nest without following the proper process, the charger would remain turned off, and thus would not be usable as a charger.

At block 440, the charging station turns off the charger, and if the charger's power level is below a threshold, turns on the power to the nest, and starts recharging the charger. In one embodiment, the turning off is done by sending a command to the charger's CPU, via the magnetic connector. In one embodiment, if the charge level in the charger is above a threshold, it is not charged. In one embodiment, that threshold is 80% charge. In another embodiment, that threshold is 95% charge. In one embodiment, the threshold may be any level of charge that retains a useable amount of power in the charger. The process then returns to block 415, to continue reporting the status of each nest, and each charger.

Figure 5:
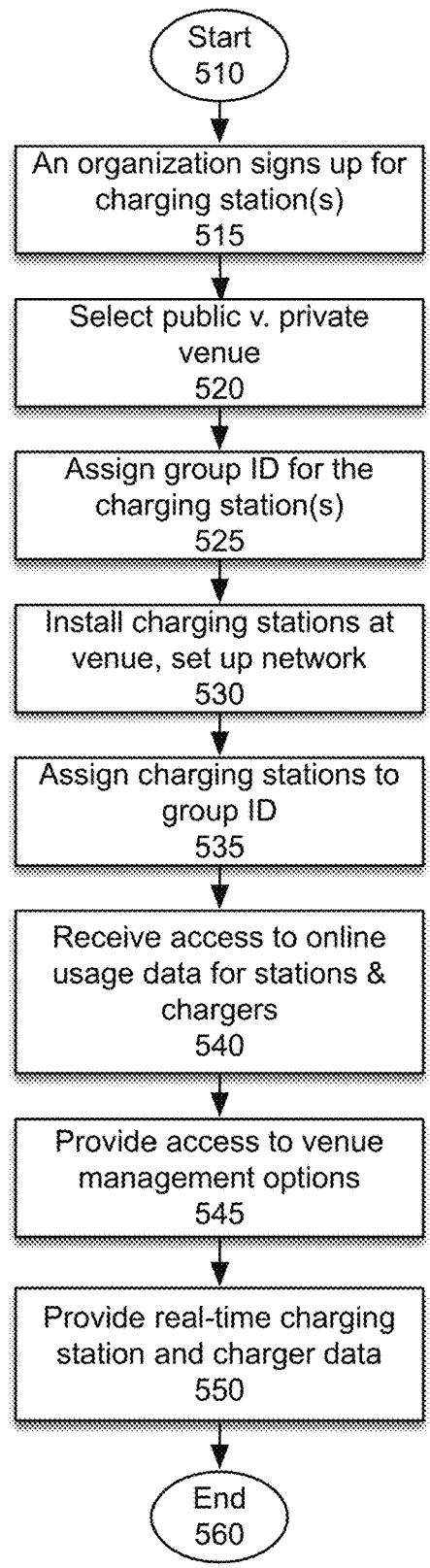
FIG. 5 is a flowchart of one embodiment of signing up an organization to host charging stations.

FIG. 5 is a flowchart of one embodiment of signing up an organization to host charging stations. The process starts at block 510. At block 515, an organization signs up for one or more charging stations. In one embodiment, an organization may indicate how many charging stations they want to host, and how many venues they want those charging stations for.

At block 520, the organization selects whether they will be a public or private venue. A pubic venue allows anyone with the application to obtain a charger, and return a charger. A private venue restricts access to the charging station and the chargers to members. Generally, most organizations would be public venues.

At block 525, a group ID is assigned to the charging stations. In one embodiment, a group ID is for a particular location. In another embodiment, an organization can assign multiple group IDs to a single venue, when there are multiple locations with stations inside the venue. For example, the common area of a university may have a charging station at the cash registers and in the dining hall, etc. Thus, an organization signing up for multiple locations would get multiple group IDs.

At block 530, the charging stations are installed at the venue. Installation includes, in one embodiment, setting up a wall-mounted board, a kiosk, or a table stand. Installation also includes connecting the charging stations to power and network.

At block 535, the charging stations are assigned to the group ID.

The charging stations are now ready for use, if they are in a public venue. For a private venue, in one embodiment a separate application is made available to users. In one embodiment, the venue may add the users who are members/permitted to take chargers to a permissions list, and the same application may be used with permission validation. In one embodiment, users may join the venue by entering a subscription code, clicking through a link, or otherwise obtaining an access code.

At block 540, the owner receives access to online usage data for the stations and chargers. The online usage data permits the organization to monitor how their charging stations are utilized. The organization may then add charging stations, remove charging stations, move charging stations between locations, etc.

At block 545, the administrator or manager of the venue receives access to venue management options. The venue management options may permit the administrator to control the hardware, do diagnostics, change light displays, alter color preferences, etc. In another embodiment, this type of control access may not be provided.

At block 550, the organization is given access to real-time charging station and charger data. The process the ends at block 560.

Figure 6:
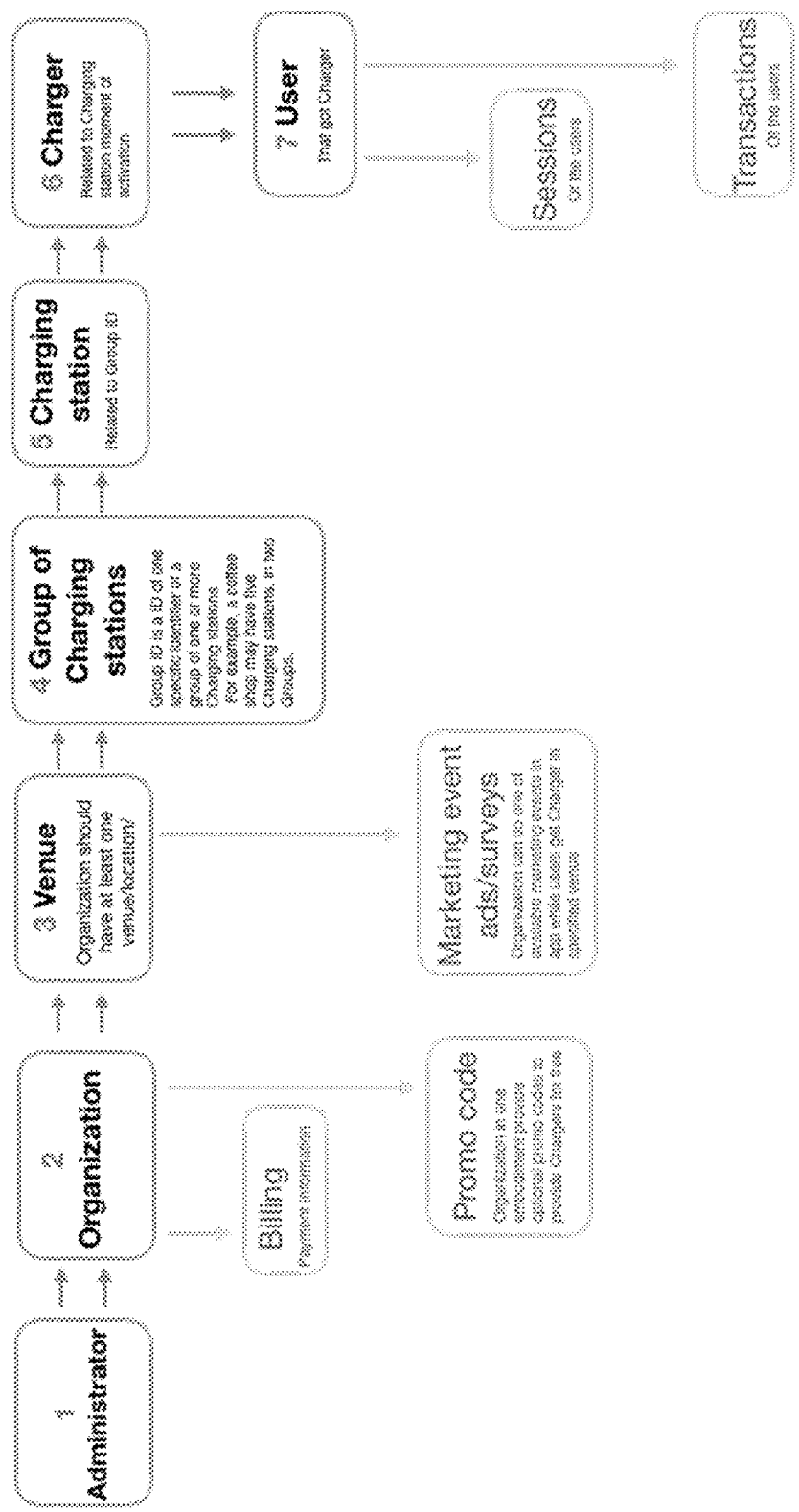
FIG. 6 is a block diagram of one embodiment of the structure of a transaction, including the identification of the components involved from the individual transaction to the administrator.

FIG. 6 is a block diagram of one embodiment of the structure of a transaction, including the identification of the components involved from the individual transaction to the administrator.

Figure 7:
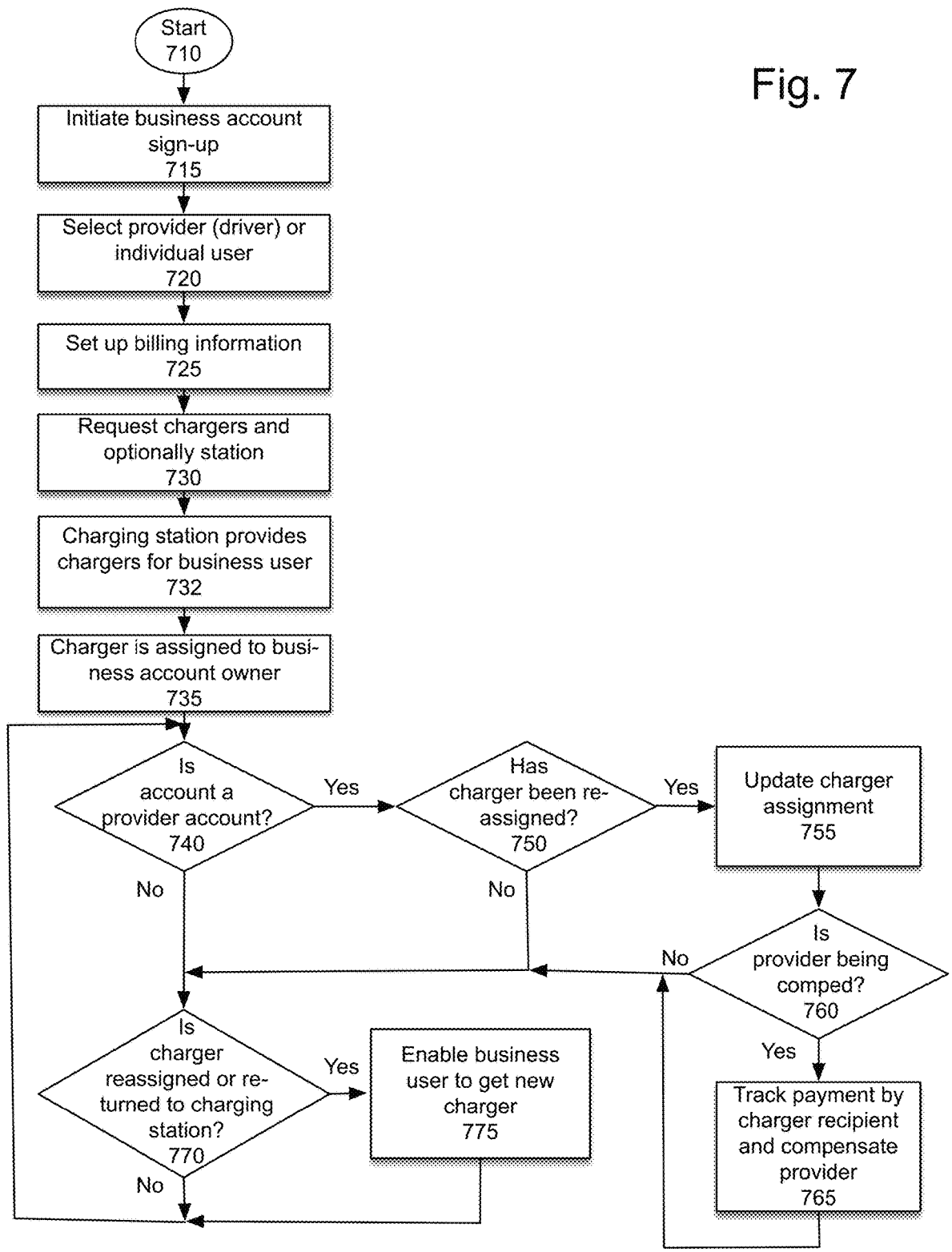
FIG. 7 is a flowchart of one embodiment of signing for a business account by a provider or individual user or provider.

FIG. 7 is a flowchart of one embodiment of signing for a business account by a provider or individual user or provider. An individual user may wish to have a charging station in their home or their car. In one embodiment, they are able to sign up for an account and set up a charging station. In one embodiment, a provider is a user who provides chargers to others. This may be done via delivery (e.g. picking up chargers and taking them to requesting users), as an add-on service for other services (for example for a taxi or ride sharing service), etc. The process starts at block 710.

At block 715, the business account set up is initiated. At block 720, the user determines whether they want to have a personal charging station, or whether they want to be a provider.

At block 725, the user sets up billing information. In one embodiment, the user is charged for the cost of a charging station, if they choose to have one in their home.

At block 730, the user requests the chargers and optionally a charging station. The order process is then complete. In one embodiment, the charging station and chargers are shipped to the user. In another embodiment, if the user is only getting chargers, the user may pick up one more chargers from any charging station, at block 732.

At block 735, the charger is assigned to the business account owner.

At block 740, the process determines whether the account is a provider account. A provider account can assign chargers to others. In one embodiment, this is done using the provider account.

At block 750, the process determines whether the charger has been reassigned. In one embodiment, the charger is reassigned when the provider scans the charger, and the recipient of the charger also scans the charger.

At block 755, the charger assignment is updated. The charger is reassigned from the provider to the recipient. At block 760, the process determines whether the provider is being compensated for the delivery. If so, the payment is tracked, at block 765.

The process then continues to block 770.

At block 770, the process determines whether the provider's charger has been reassigned or returned to a charging station. If the charger is reassigned or returned to the charging station, the user, at block 775 can get a new charger. The process then returns to block 740. In this way, a provider like a driver or delivery person can provider chargers to users.

Figure 8:
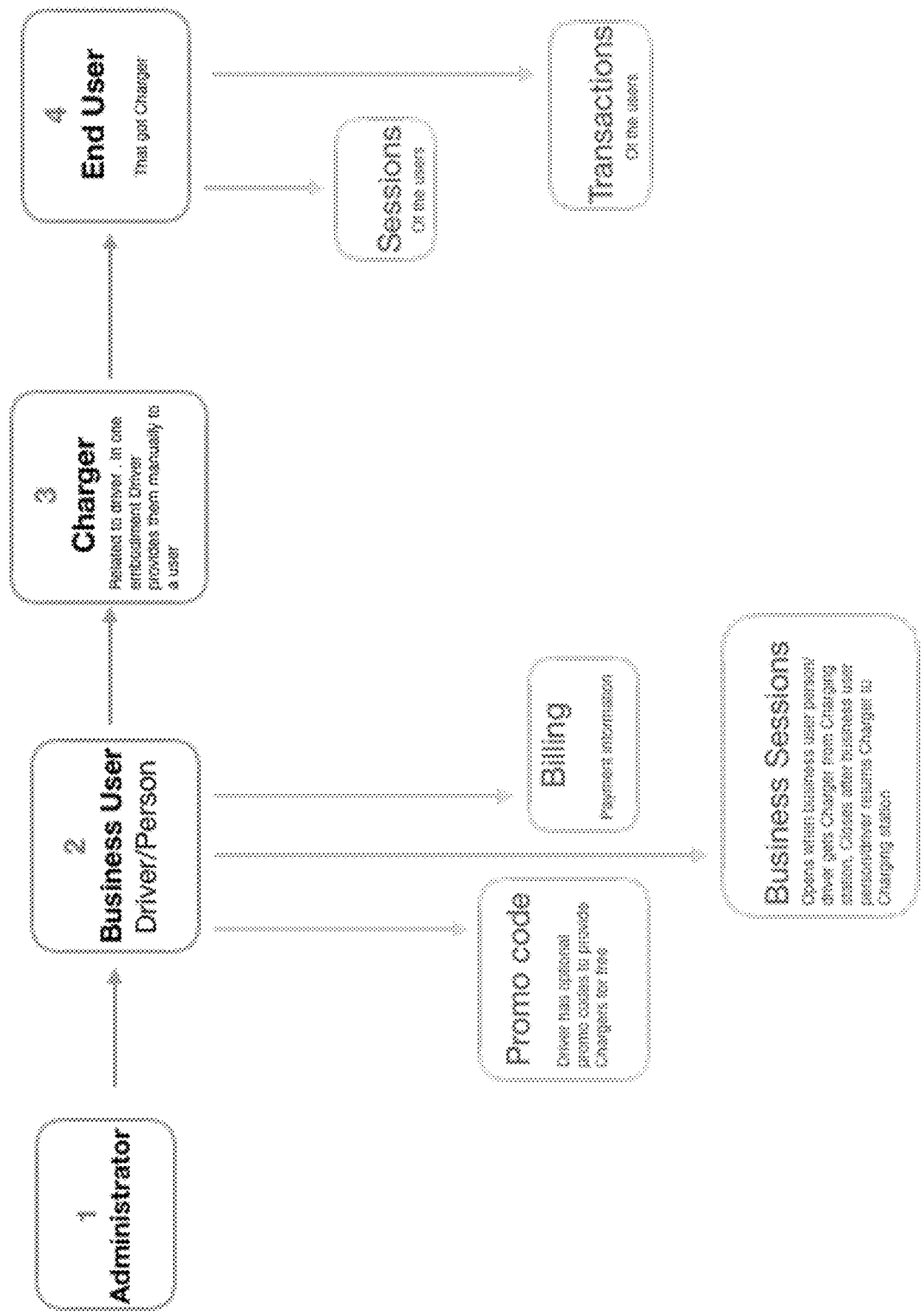
FIG. 8 is a block diagram of one embodiment of the structure of a transaction, including the identification of the components involved.

FIG. 8 is a block diagram of one embodiment of the structure of a transaction, including the identification of the components involved.

Figure 9A:
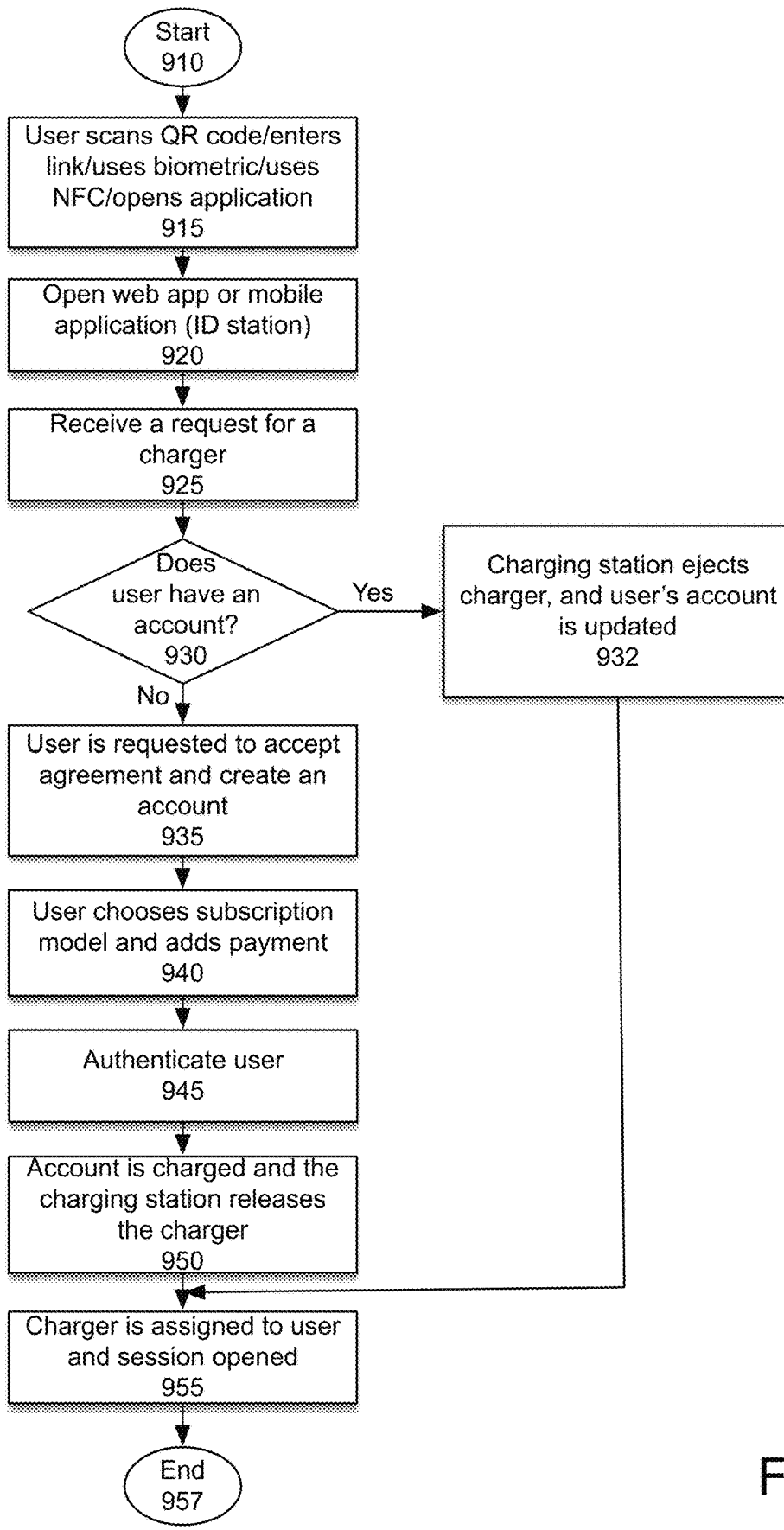
FIG. 9A is a flowchart of one embodiment of the normal interaction between the charging station and a user.

FIG. 9A is a flowchart of one embodiment of the interaction between the charging station and a user for obtaining a charger. The process starts at block 910.

At block 915, the user initiates the process. This may be done by scanning a QR code associated with the charging station, entering a link, using a biometric such as a fingerprint or voice, using an NFC, opening the application and selecting "request charger," or taking another action to initiate the process.

At block 920, the system automatically opens a web application or downloaded application, in one embodiment, and a request for a charger is initiated. In one embodiment, if the charging station is not yet identified, by scanning the QR code which includes the ID, the user is asked to enter the group ID, or otherwise identify the particular charging station.

At block 930, the process determines whether the user already has an account. If so, the process continues to block 932. In one embodiment, if the user has an account but their log-in has expired, the user is requested to authenticate themselves. Once authentication is complete, and the Group ID of the station is received, so the system knows which charging station to use, at block 932 the charging station ejects the charger, and the charger is assigned to the user. The user's account is updated indicating that a charger was taken out. In one embodiment, the user may have a subscription account, in which case they are not charged. In one embodiment, the user may have an hourly account, in which case they are charged. In some embodiments, the chargers are provided at no cost to the user.

At block 955, the charger is assigned to the user and a session is opened. The session is open until the charger is returned to the charging station, or reassigned if the user has a repair/provider type account. The process then ends at block 957.

If the user does not have an account, as determined at block 930, the process continues to block 935.

At block 935, the user is asked to create an account and accept the user agreement. At block 940, the user chooses a subscription model, and adds a payment mechanism. In one embodiment, the subscription model may be a monthly subscription, an hourly subscription, or another type of subscription.

At block 945, the user is authenticated.

At block 950, the account is charged for the subscription, and the charging station releases a charger. In some embodiments, there may not be a charge for the subscription. For example, an organization may set up a free private charging station ecosystem.

At block 955, the charger is assigned to the user, and a session is opened. The process then ends at block 957.

Figure 9B:
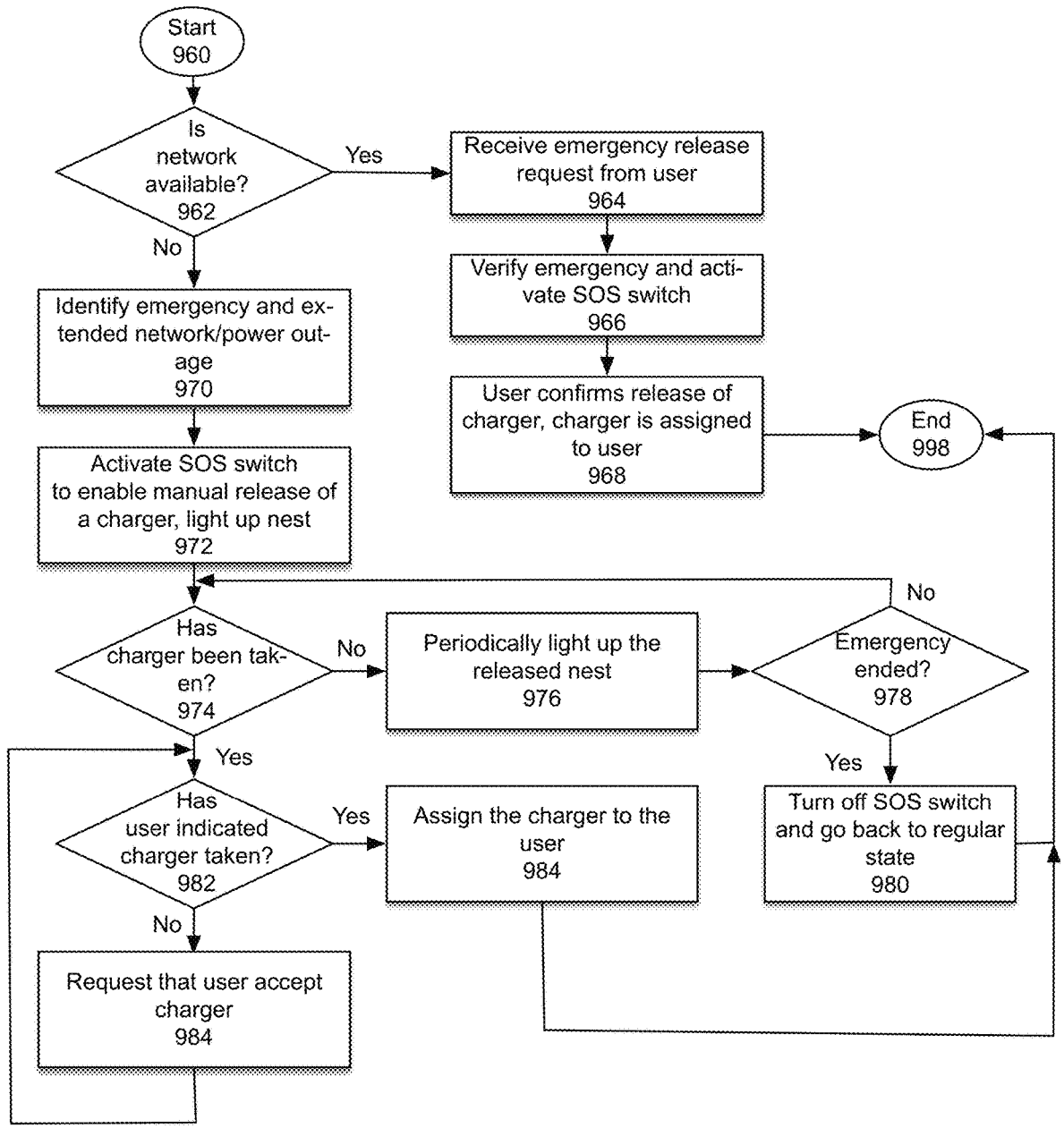
FIG. 9B is a flowchart of one embodiment of the interaction between a charging station and a user in an emergency scenario.

FIG. 9B is a flowchart of one embodiment of interacting with an intermittently connected charger. In one embodiment, the system has an emergency option, which enables the release of a charger, in an emergency scenario even if the charging station cannot successfully connect to the network. In one embodiment, the ejection may also work if the charging station does not have power. In one embodiment outdoor charging stations may have backup power through a solar panel.

The process starts at block 960. At block 962, determines whether the network is available. If so, at block 964 the charging station receives an emergency release request from a user. At block 966, the system verifies the emergency. Once verified, the SOS switch is activated. The SOS switch provides a manual override of the nest lock, which permits removal of a charger.

At block 968, the user confirms release of the charger, and the charger is assigned to the user's account. The process then ends at block 998.

If network is not available, and thus the user cannot request the emergency release, the process continues to block 970.

At block 970, the process identifies an emergency, and extended network and power outage. In one embodiment, this is done manually by administrators. In one embodiment, the venue administrator may make this determination. In another embodiment, only the owner may make this determination.

At block 972, the SOS switch is activated, to enable manual release of a charger. In one embodiment, if power is available, the charging station may light up the nest from which a charger has been released.

At block 974, the process determines whether a charger has been taken. If not, at block 976, the released nest may be periodically lit, to indicate its availability. The process then determines, at block 978 whether the emergency has ended. If not, the process continues to block 974. If the emergency has ended, at block 980 the SOS switch is turned back off, and the charging station returns to its regular state. The process then ends at block 998.

If at block 974, the process determines that the charger has been the process continues to block 982.

At block 982, the process determines whether the user has indicated that the charger has been taken. The user may indicate in the application that they have taken an emergency charger. If the user accepts the charger, the charger is assigned to the user, at block 984. The process then ends at block 998.

If no user has accepted the charger, the system requests that the user accept the charger, at block 984. In one embodiment, the charger may connect to a charging station if it is in proximity, via a wireless connection such as Wi-Fi, Bluetooth, etc. In one embodiment, the charger may connect to the user's mobile device, via a wireless connection to request that the user accept the charger assignment. Then, the process returns to block 982, to check whether the user has done so.

In this way, in an emergency the system may be used to provide power, even when the charging station itself is not powered, and does not have an Internet connection.

Figure 10:
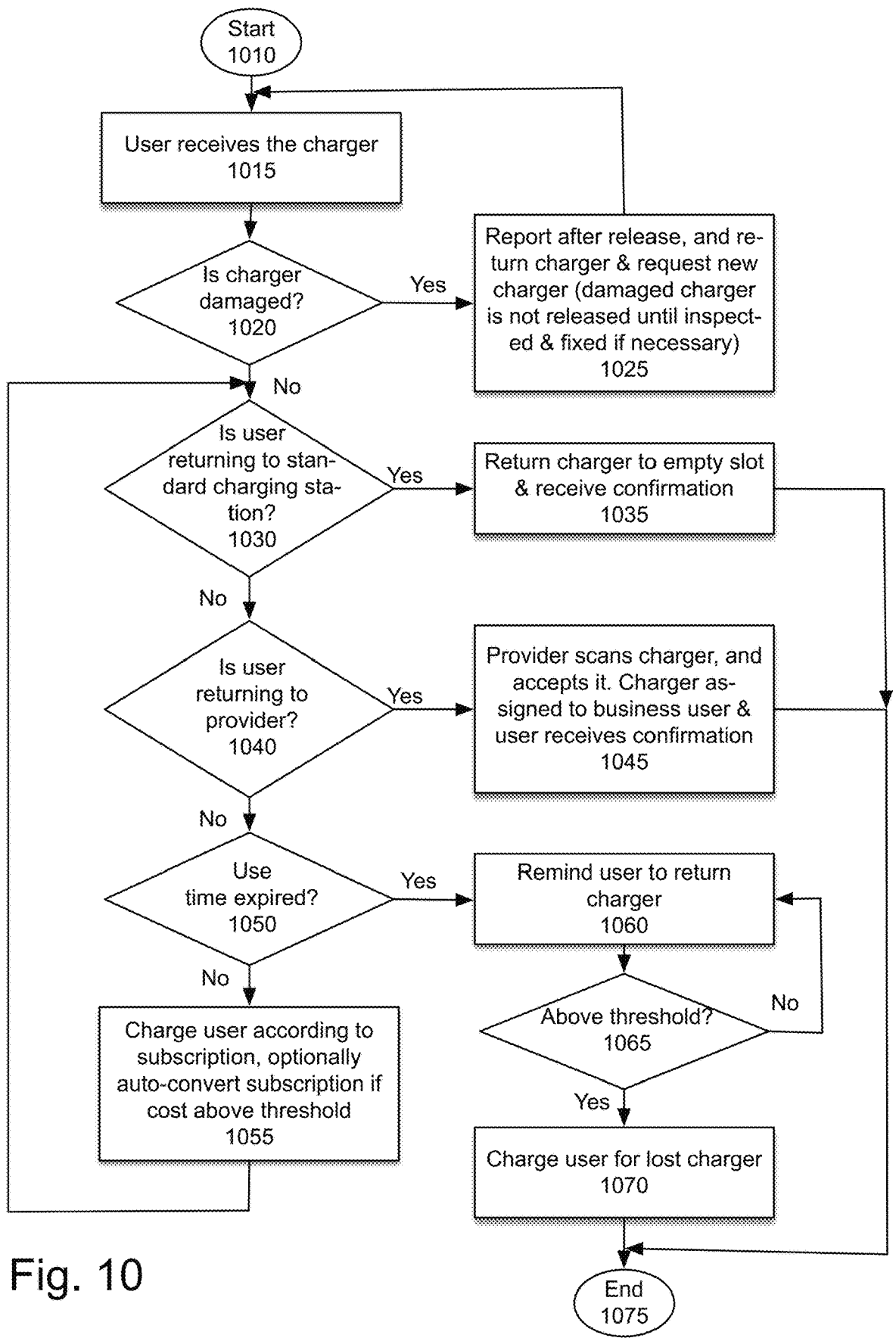
FIG. 10 is a flowchart of one embodiment of the interaction between the user and a charger that has been checked out from a charging station.

FIG. 10 is a flowchart of one embodiment of the interaction between the user and a charger that has been checked out from a charging station. The process starts at block 1010.

At block 1015, the user receives the charger. At block 1020, the user may determine that the charger is damaged. If that is the case, the user may report it promptly after receiving the charger. If the user does so, the user is issued a new charger, and any charges associated with the damaged charger are removed. The charging station, in one embodiment, locks in the damaged charger and does not release it to another user until it has been cleared for use again. This may be done, in one embodiment, by the organization, administrator, a repairer, or system provider, or algorithm. In one embodiment, the system may perform a reset on the charger. Once the charger has been reset, in one embodiment, the charging station may charge and discharge the charger, and if the charging status data indicates that the charger is functioning correctly, release the charger.

If the charger is not damaged, the process determines whether the user is returning the charger to a charging station, at block 1030. This may be any public charging station if the charger was obtained from a public charging station.

If the user is returning it to a charging station, they return it to any empty nest, and receive confirmation that the charger has been successfully returned. In one embodiment, the charging station flashes a green light confirming, and a message is sent via the application, text, or another means confirming the return. In one embodiment, if the user's subscription is hours based, the process also closes out the session and ensures that the appropriate charges or use tracking has occurred.

If the user is returning the charger to a provider, at block 1040, at block 1045, the provider scans the charger. The charger is assigned to the business user, and the user receives confirmation that their session has closed.

If the user has not returned the charger to a charging station or a provider, at block 1050, the process determines whether the rental time has expired. In one embodiment, rental time over 24-hours is considered expired. In some embodiments, the user may indicate their intended rental time at the time of rental (e.g. "rent for two hours") and the rental may expire at the end of that period.

If the time has not yet expired, the user is charged according to their subscription. In one embodiment, if the user has an hourly subscription but the time they have had the charger would cost them more than the weekly or monthly rental cost, the user's account may be updated to a different subscription model. The user may alter this back, at any time. The process then returns to block 1030, to determine whether the user has returned the charger.

If the time has expired, at block 1050, the user is reminded to return the charger at block 1060. In one embodiment, reminders to return the charger start after some number of hours, e.g. 3 hours. In one embodiment, multiple reminders may be sent. At block 1065, the process determines whether the time since the charger was due to be returned is above a threshold. In one embodiment, the threshold is two days. Other thresholds may be set. In one embodiment, the initial reminders are followed with reminders that a cost for a lost charger may be incurred if the charger is not promptly returned. If the time is above the threshold, at block 1070, the user is charged for a lost charger. The process then ends at block 1075.

Figure 11:
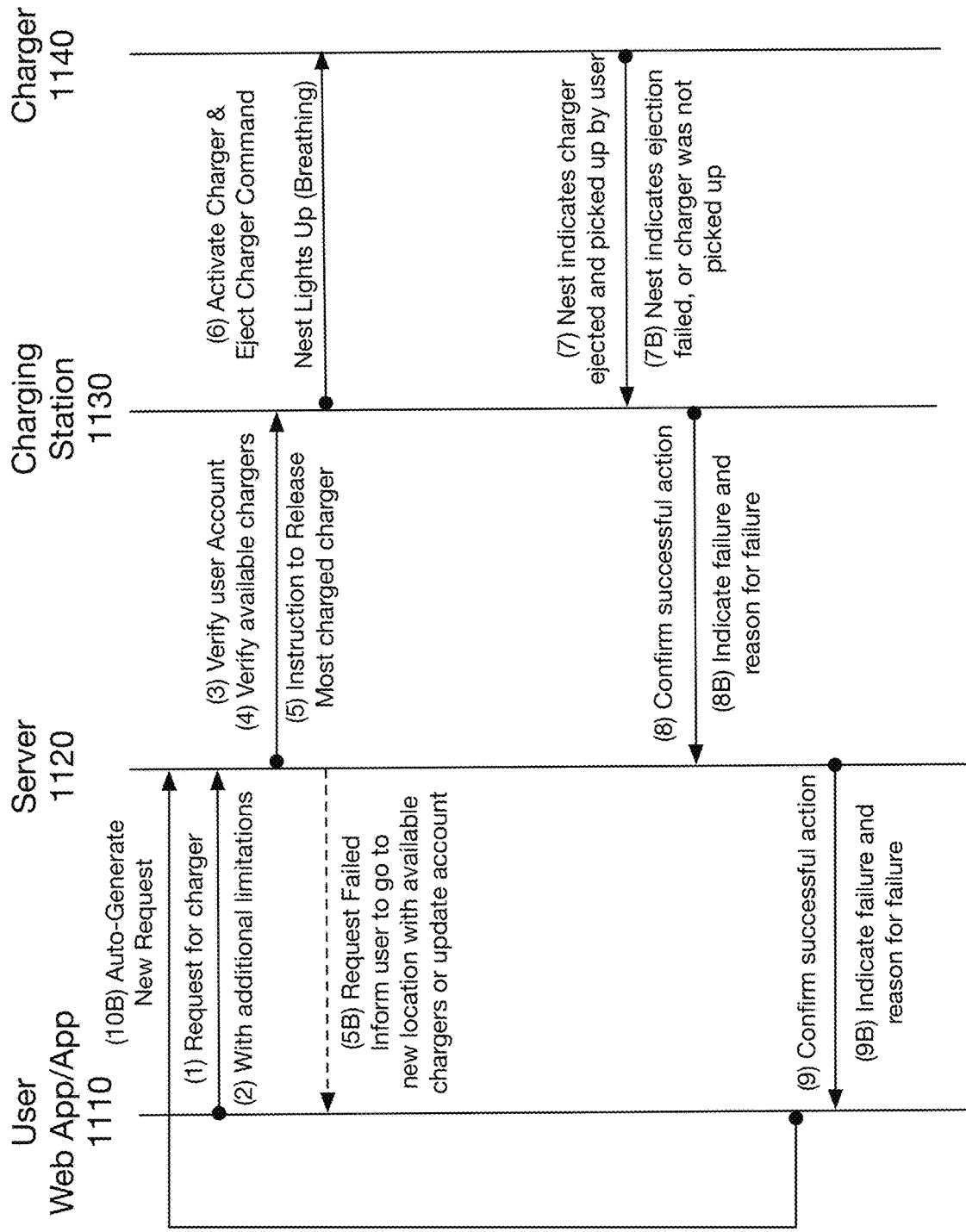
FIG. 11 is a signal diagram showing the interaction between the user side, the server, the charging station, and the charger being released to a user.

FIG. 11 is a signal diagram showing the interaction between the user side, the server, the charging station, and the charger being released to a user. The user app initiates the process by sending a request for a charger to the server. In one embodiment, the request may include additional limitations. The additional limitations, for example, may include the type of connection needed, the type of power needed (e.g. mobile phone v. laptop charger) ADA access needed, etc. ADA access, in one embodiment, ensures that the charger released can be reached by someone in a wheelchair.

Figure 24:
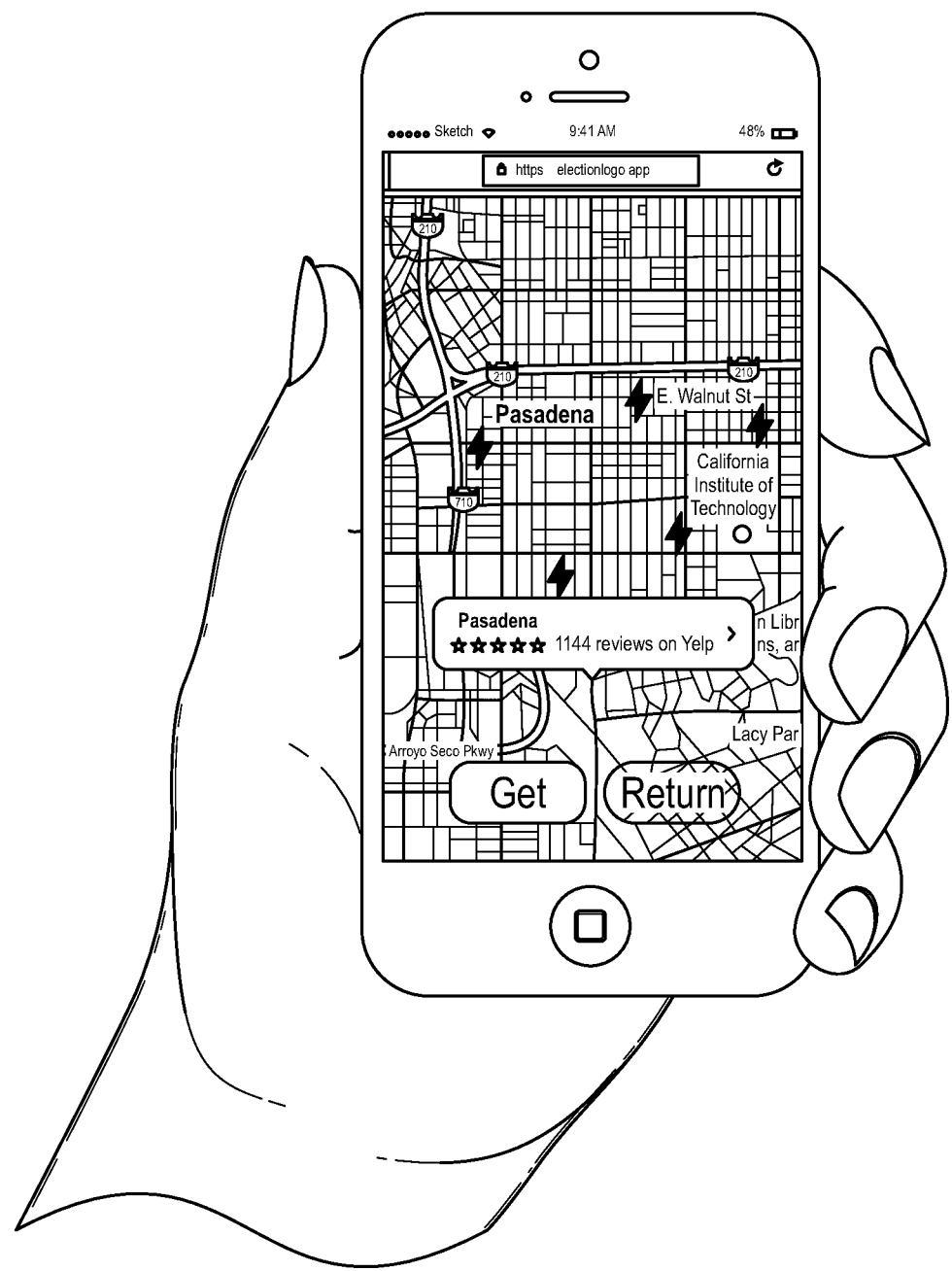
FIG. 24 illustrates an exemplary map display showing public charging stations.

The server then verifies the user account, and uses data from charging station 1130 to verify available chargers. The server 1120 then sends a message to the charging station to release a charger. If the user account validation fails, the user subscription verification fails, or the charging station lacks available chargers, the request fails, and a message is sent back to the user to update their account or go to a location with available chargers. In one embodiment, a map of charging stations may be provided to the user, an embodiment of which is shown in FIG. 24. In one embodiment, the map may include information about the number of available chargers (non-reserved). In one embodiment, the application may enable users to filter the list or mapped location of charging stations to show only those charging stations that have available chargers (get) or available empty nests (return).

In one embodiment, the most charged charger is released. In one embodiment, the limitations with the request may alter which charger is released. In one embodiment, the charger may be released based on usage data, e.g. the charger with charge above a threshold that has seen the least use may be released.

The charging station 1130 sends the signal to activate the charger, and sends the eject charger command to the nest. In one embodiment, the nest lights up, when the command to eject the charger is received, to indicate to the user which charger to pick up. In one embodiment, the lighting pattern used by the nest is a breathing pattern. The nest indicates that the charger has been ejected, and picked up by the user. Alternatively, the nest may indicate that either the ejection failed, or the charger was not picked up by the user.

If the process was successful, the confirmation is sent to the server. If the process failed, the failure is sent to the server.

The server sends the success or failure message to the user. In one embodiment, if there is a failure, and the failure was to by the user, e.g. there was a mechanical failure on ejecting a charger, the process automatically loops back and auto-generates a new request for a charger. In one embodiment, this may be transparent to the user with no indication that a failure occurred except a slightly longer wait for the charger to be available.

Figure 12:
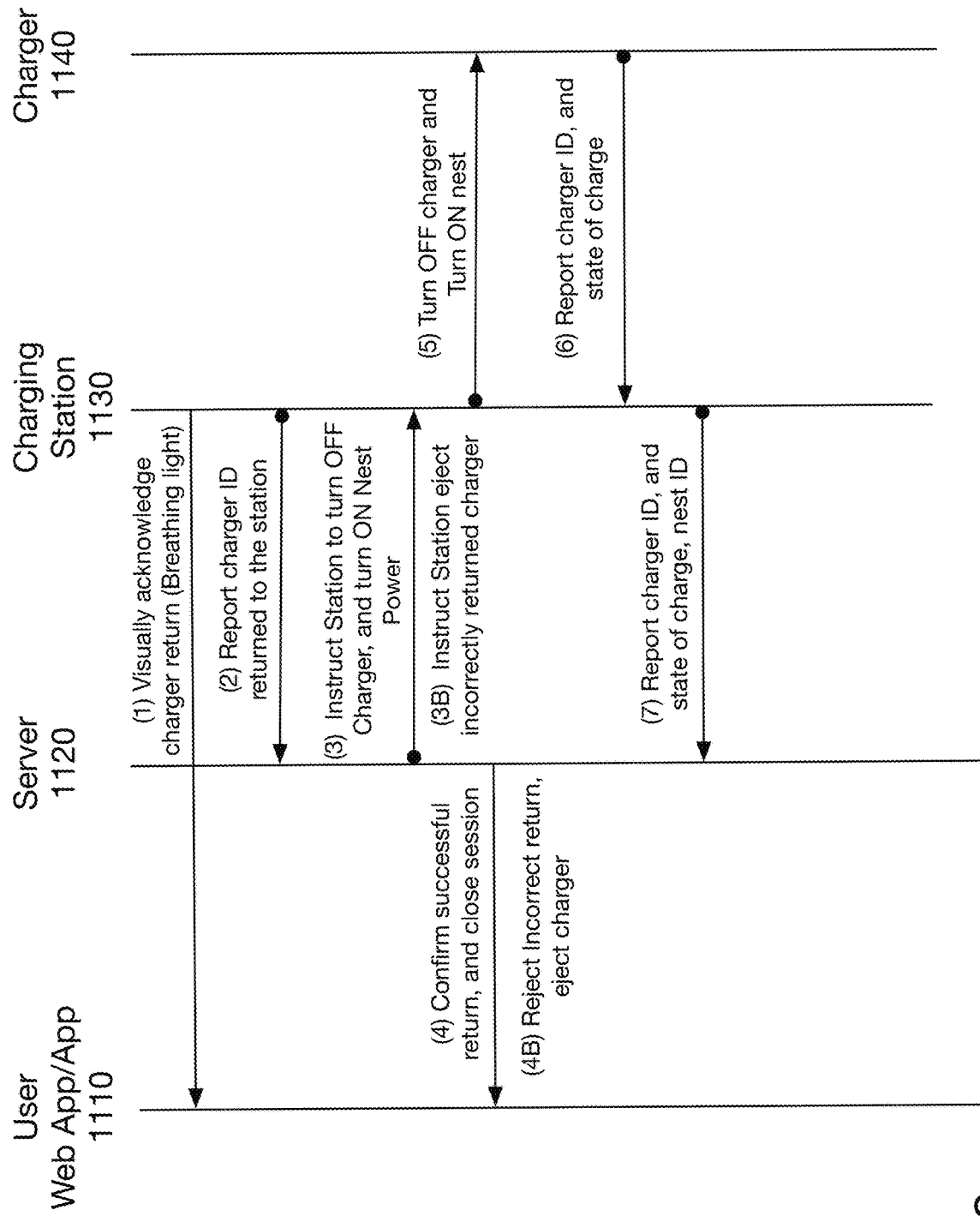
FIG. 12 is a signal diagram showing the interaction between the user side, the server, the charging station, an charger being returned to a charging station.

FIG. 12 is a signal diagram showing the interaction between the user side, the server, the charging station, and the charger being returned to a charging station.

When the user puts a charger into a charging station the charging station detects the newly occupied nest, and collects the charger ID, and reports the charger ID returned to the station. The station verifies that the return is correct, by verifying the charger ID. In one embodiment, if the user is attempting to return a public charger to a private charging station, or a private charger to a public charging station, the incorrect return is rejected. The server instructs the station to eject the charger. The charger is ejected by the system, and the user is informed that the return cannot be made.

If the charger is being appropriately returned, in one embodiment, the charging station turns on the nest, and the charging station provides a visual feedback to the user of a successful return. In one embodiment, this is a breathing light, confirming acceptance of the charger.

The charging station turns OFF the charger, and then turns ON power for the nest. In one embodiment, this command comes from the server. In another embodiment, this command may come from the charging station.

The charging station 1130 also informs the server of the return. The server confirms a successful return of the charger to the charging station, and closes the open session with the user. In one embodiment, final accounting is done, based on the usage data.

The charger reports its charger ID and charger state. The charger state in one embodiment includes state of charge, voltage level, battery temperature, and charging state. In one embodiment, the state of charge is derived from information reported by the charger, and indicates the relative percentage of charge for the battery. The charging station reports the charger ID, charger state, and the associate nest ID to the server. The server tracks the charger IDs, states of charge, and which nests are occupied.

Figure 13:
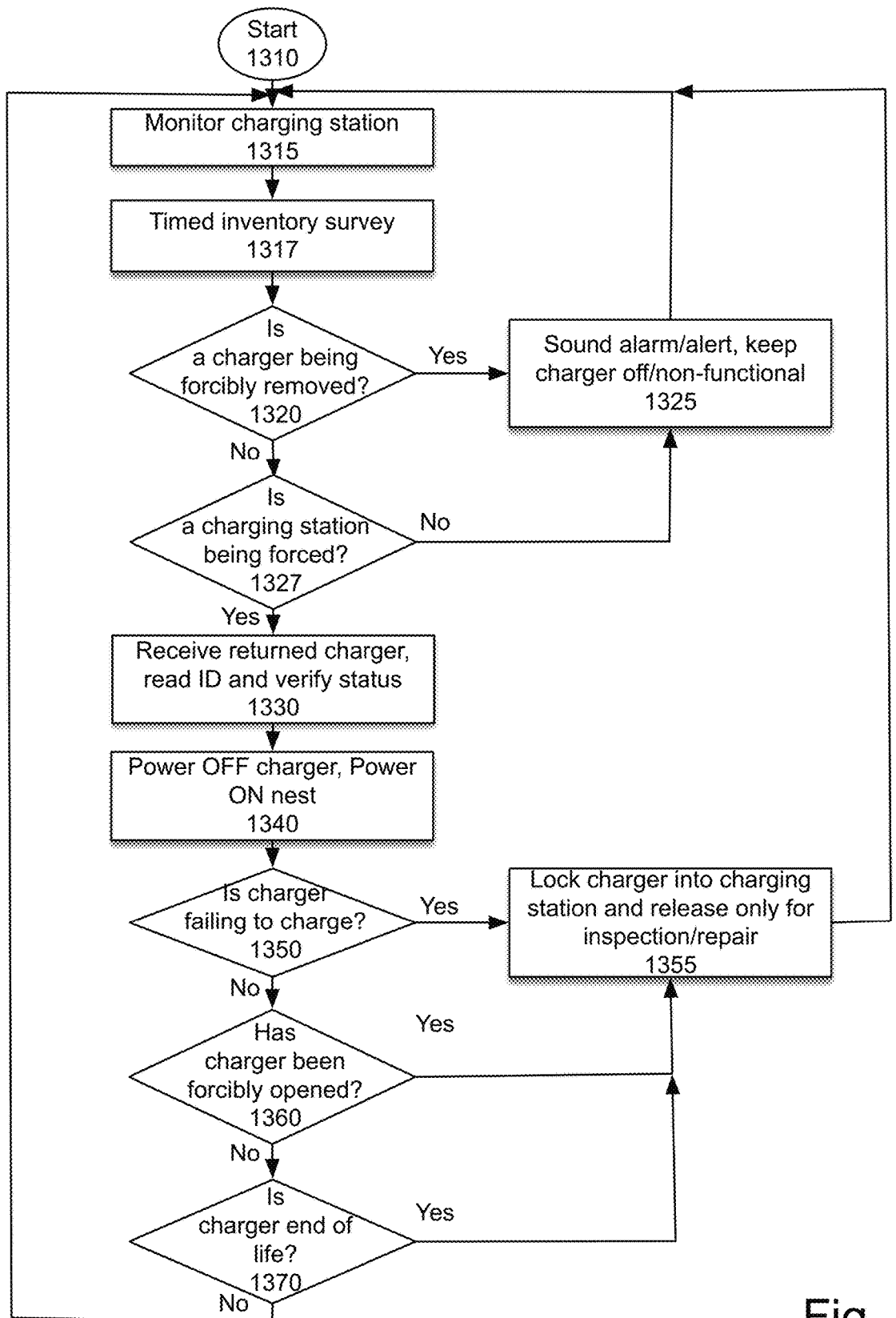
FIG. 13 is a flowchart of one embodiment of the standard communication between the charging station and the chargers.

FIG. 13 is a flowchart of one embodiment of the standard communication between the charging station and the chargers. The process starts at block 1310. At block 1315, the charging station monitors its own status. In one embodiment, at block 1317, the charging station does an inventory survey. In one embodiment, the charging station does an inventory survey periodically. The period may be every 10 seconds. In another embodiment, the period may be every 30 seconds, or longer.

At block 1320 the process determines whether the charger is being forcibly removed. In one embodiment, this occurs if a nest indicates that a charger has moved, when the charging station has not ejected the charger. If so, an alarm is sounded. In one embodiment, the alarm is built into the mounting socket. In addition to not having to route it through the charging station, it also means that even if the charging station is ripped off the wall, the alarm will remain attached, and sounding. In one embodiment, the alarm may also include visual alarms (flashing red lights, for example).

The charger is maintained off, so it is not functional. In one embodiment, the alarm stops when the charger is returned to the charging station. In one embodiment, the alarm stops only when the system has verified that the same charger that was removed has been returned to the charging station. At block 1327, the process determines whether the charging station itself is being assaulted. If so, the process continues to block 1325, and an alarm is sounded, and all chargers are maintained off, so they are not useful. The process then returns to block 1315.

At block 1330 a charger is received in the charging station. The status of the returned charger is verified, as is its charger ID. In one embodiment, the charger may be rejected if the charger ID indicates that it cannot be returned to this charging station. At block 1330, the charger status is verified. In one embodiment, this is done via the inventor survey, which obtains the charger ID, charger voltage level, and charger state.

At block 1340, the charger is powered OFF. Then the nest is powered on, if the charger connection is verified so that the charger can be charged.

At block 1350, the process determines whether the charger is failing to charge. If so, at block 1355 the charger is locked into the charger station, until it has been replaced, fixed, or confirmed functional. In one embodiment, a repairer may be alerted to this status. The process then returns to block 1315 to continue monitoring the system.

The process determines at block 1360 if the charger has been opened. In one embodiment, there is a hardware element inside each charger, which shows whether the charger case has been physically opened. Because an opened charger case may be a vector for malware, or other issues, if the hardware element indicates the charger case has been opened, the process at block 1355 locks in the charger. In one embodiment, the hardware element is a switch which is depressed during assembly but nearly impossible to depress when not in a manufacturing setting. In one embodiment, the hardware element is an electronic connection made over the seam of the charger, such that the electrical connection is broken when the case is opened. If one embodiment, the hardware element is a spring. Other hardware elements may be used to verify that the charger case has remained intact.

The process determines at block 1370 whether the charger is at end of life. In one embodiment, the average battery has between 400 and 1200 charge-discharge cycles before it no longer functions well. Therefore, the system monitors the state of the batteries, to ensure that none of the batteries have reached end of life. If a battery has reached end of life, the process returns to block 1355 to lock the charger into the station. In this way the system monitors its own state continuously.

Figure 14:
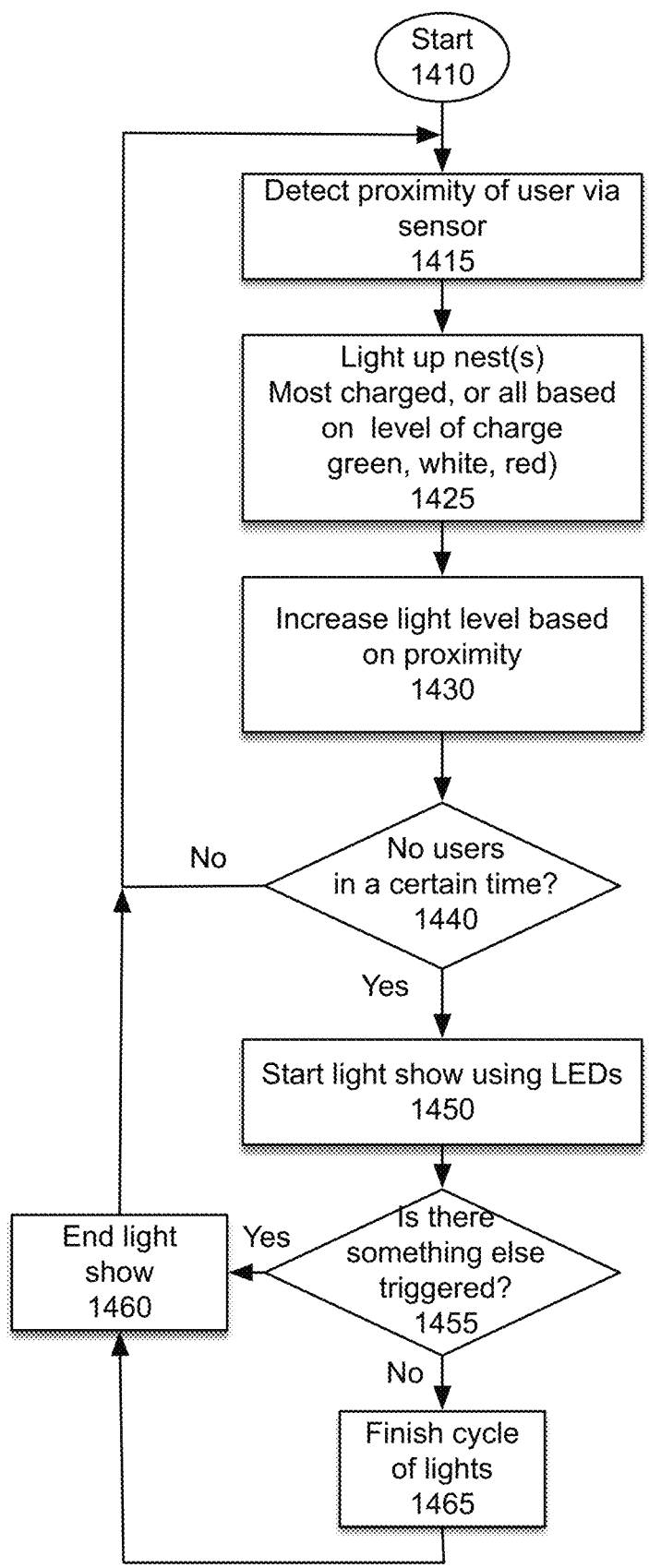
FIG. 14 is a flowchart of one embodiment of the use of lights by the charging station.

FIG. 14 is a flowchart of one embodiment of the use of lights by the charging station. In one embodiment, the charger casing is translucent, and the charger has RGB LEDs around its edges. The system may do various things with these lights.

At block 1415, the process detects a user is in proximity to the sensor. In one embodiment, the detection may be someone waving a hand in front of the charging station.

At block 1425, the chargers are lit up based on a level of charge. In one embodiment, the all chargers are lit in green, yellow, and red, based on a level of charge. In another embodiment, only the nest of the most charged charger is lit up.

In one embodiment, the light level is increased and decreased based on proximity, at block 1430. In one embodiment, the lights may have a breathing pattern, becoming brighter and dimmer in a regular pattern approximately matching standard human respiration.

At block 1440, the process determines that there had been no interaction with the charging station in a certain time. In one embodiment, the time is 5 minutes. In one embodiment, the time may set by the venue anywhere between seconds and hours. If there had been users within the timeframe, the process returns to block 1415 to continue monitoring for proximity and time elapsed.

If there had been no users within a certain time, an LED lightshow is played. In one embodiment, the LED lightshow is programmable using the RGB lights of the chargers. In one embodiment, the default LED lightshow uses patterns of light to engage the attention. However, the light show is the lowest priority task for the charging station. Therefore, during the show the process monitors whether something else is occurring such as a request for a charger, or a proximity of a user. If so, the light show is ended at block 1460 and the system responds to the priority request. If nothing interrupts, the light show cycle finishes, at block 1465, and ends. In one embodiment, the time is reset, so the period between light shows is the time set by the venue.

Figure 15:
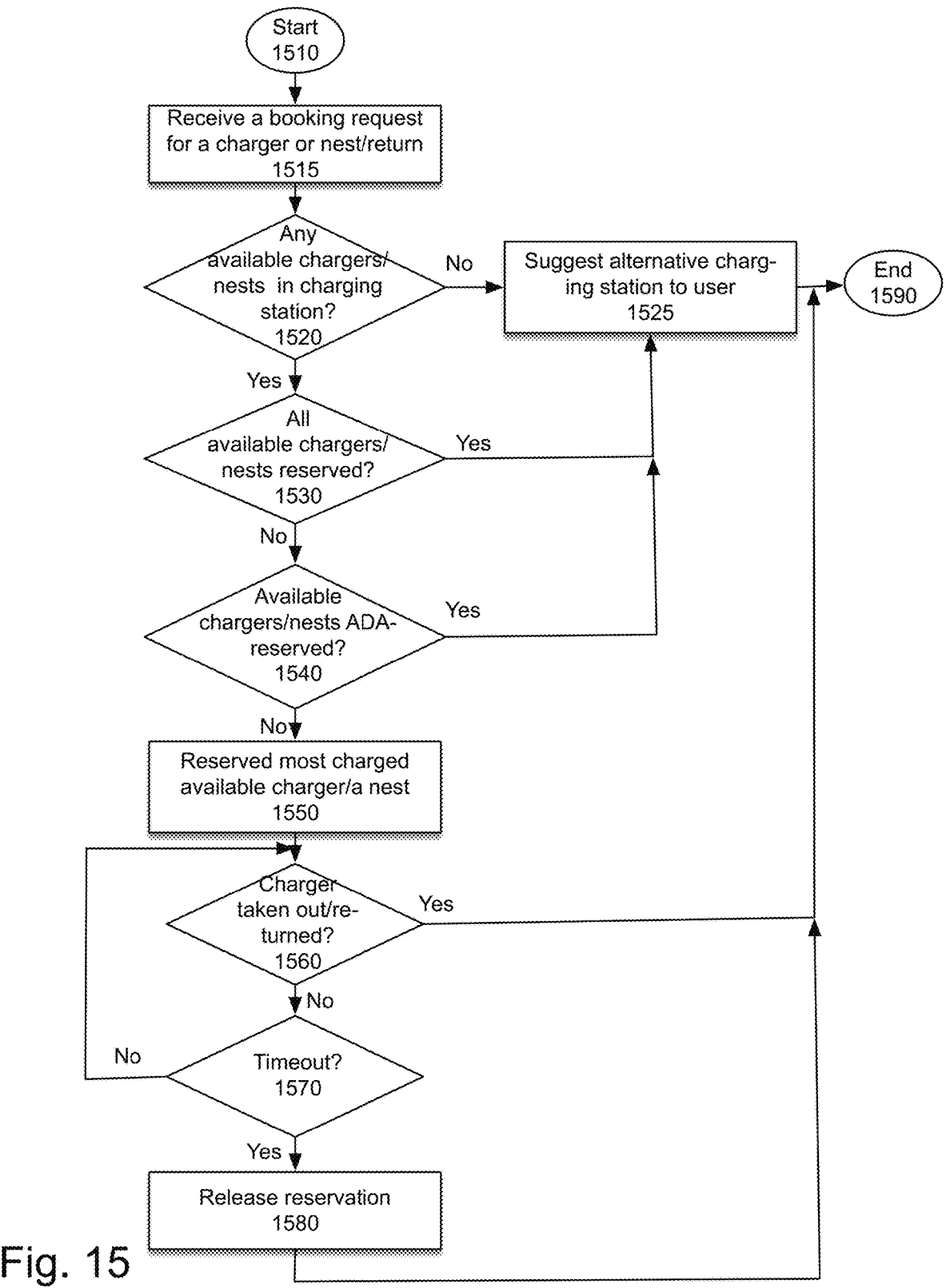
FIG. 15 is a flowchart of one embodiment of a reservation process.

FIG. 15 is a flowchart of one embodiment of a reservation process. The process starts at block 1510. At block 1515, the system receives a reservation request from a user for a charger, or for a nest to return a charger. In one embodiment, the user may make this reservation by selecting a nearby charging station, from map, such as the one shown in FIG. 24.

At block 1520, the process determines whether there are any available chargers/nests, as requested, at the nearby charging station If not an alternative charging station is suggested to the user, at block 1525. The process then ends at block 1590.

At block 1530, the process determines whether all chargers/nests at the selected location are reserved. If so, an alternative charging station is suggested to the user.

The process at block 1540 determines whether all available chargers/nests are ADA-reserved. In one embodiment, and optionally for the venue's control, a subset of chargers and nests may be reserved for ADA-use. In one embodiment, the two lowest placed nests and chargers are reserved for ADA-use. This would mean that one or two nests and/or chargers are not made available if the user requesting them has not indicated that they request the ADA-compliant positioning for the nest and/or charger. If all available chargers/nests are ADA reserved, at block 1520 the user is guided to another charging station.

In one embodiment, rather than utilizing the above process after receiving a booking request, the system shows only those charging stations at which there are available chargers/nests on the map for the booking request when the user selects the booking option. In such instances, the process only utilizes blocks 1550-1580.

At block 1550, the most charged available charger/an available nest is reserved for the user. In one embodiment, instead of using the most charged available charger, the system selects among the chargers having a charging level above a threshold based on other factors. For example, in one embodiment, the charger may be randomly selected from among chargers having charge above 80%. In one embodiment, the system may use predictive selection, knowing that by the time the reserving user will be able to pick up the charger, the selected charger will be at the appropriate charge level. In one embodiment, the charger may be selected based on how often it had been recently used.

At block 1560, the process determines whether the reserved charger has been taken from the charging station, or the reserved nest has been used for a return. In one embodiment, a reserved charger cannot be taken out by someone else. In one embodiment, the light may indicate that a charger is reserved by lighting up that charger in red, if a user tests the charger via proximity sensor.

In one embodiment, a reserved empty nest cannot be used by someone else. If someone attempts to use the reserved empty nest, the nest rejects the attempt to insert the charger, and the user is informed that this nest is reserved for someone else. In one embodiment, the system may provide a timeframe for the reservation. In one embodiment, in such a scenario the user may be given the opportunity to perform an exchange instead of a return. That is the user may be permitted to return their charger, and immediately take out a new charger, leaving the same number of open nests. In one embodiment, when the user who reserved a charger/nest arrives at the charging station, the user can confirm the reservation by opening the application. The charger then is ejected, or the nest flashes to indicate to the user where to return their charger.

If the user has returned the charger/taken the charger, the process ends at block 1590.

If the user has not completed the transaction the process determines whether a timeout has been reached, at block 1570. In one embodiment, venues may set their own timeouts, and the user may be warned when they make a reservation, e.g. "You made a reservation at XYZ bakery for a charger, the reservation will be held for 15 minutes." In another embodiment, the reservation length may be universal. In one embodiment, the default reservation period is 30 minutes. In one embodiment, the application provides a countdown.

If the timeout hasn't yet been reached, the process returns to block 1560. If timeout has been reached, the reservation is released, at block 1580. The process then ends at block 1590.

Figure 16:
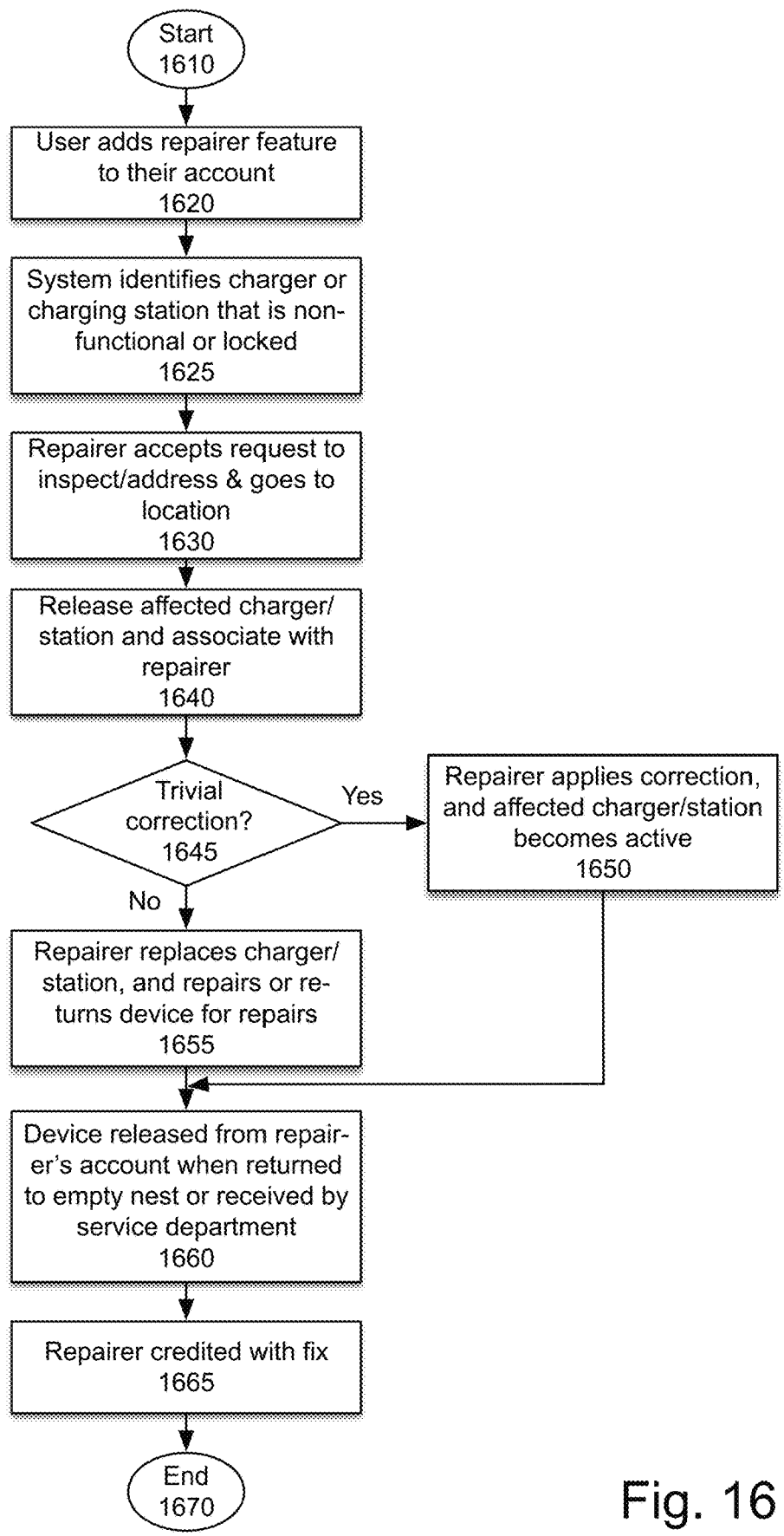
FIG. 16 is a flowchart of one embodiment of the repairer interaction with the system.

FIG. 16 is a flowchart of one embodiment of the repairer interaction with the system. The process starts at block 1610. In one embodiment repairer features may be available only to those users who have been vetted by the system owner and/or venue owner.

At block 1620 the user adds a repairer feature to their account. In one embodiment, the repairer feature is a separate application that that is accessed via a web application or a separate downloadable application.

At block 1625, the system identifies a charger or charging station that is non-functional or locked. In one embodiment, the system identifies such devices in close proximity to the user who is a repairer. The repairer is informed that there is a charging station and/or charger(s) for repair.

At block 1630, the repairer accepts the request, and goes to the location. In one embodiment, a repairer may choose to accept or refuse the repair request. In one embodiment, the repairer may indicate that they can accept at some future time. If a repairer is available earlier, they may take the repair.

At block 1640, the repairer releases the affected charger from a charging station. The charger is associated with the repairer's account. As noted above, a charger deemed to be damaged is locked into the charging station. The repairer application can unlock the nest to remove the damaged charging station. If the problem is with the entire charging station, in one embodiment, the repairer replaces the charging station with a spare station.

At block 1645, the process determines whether the repair is trivial. Trivial repairs may be something being stuck or dirty, or something similar that a repairer may be able to handle directly locally. If the correction is trivial, at block 1650 the repairer makes the repairs directly. Otherwise, the repairer replaces the charger/station and returns the device for repair.

At block 1660, the device is released from the repairer's account when the fixed charger is returned to an empty nest, whether in the same charging station or another, or when the charger or charging station are received by the repair facility. The repairer is then credited with the correction, at block 1665. In one embodiment, the complexity of the repairer's actions may be compensated. That is, a repair that involves taking a charger out of a nest, and shipping it off for repair would not be compensated as much as a repairer who fixes a problem locally.

The process then ends at block 1670.

Figure 17:
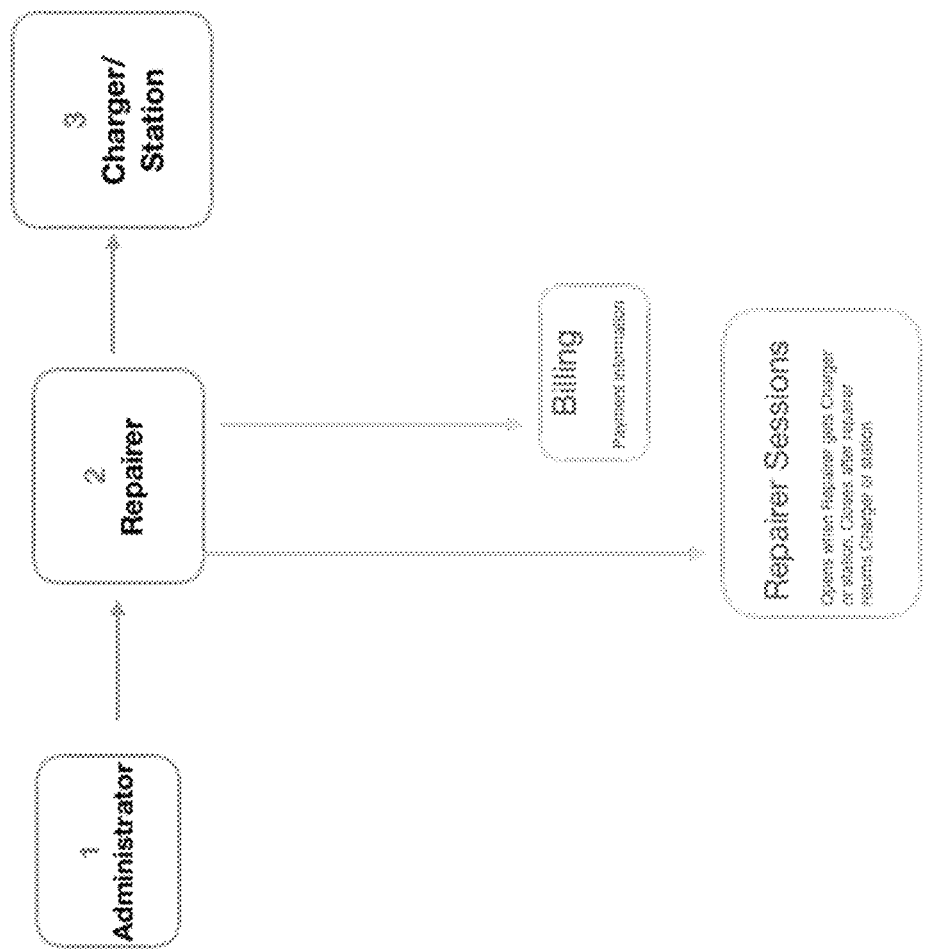
FIG. 17 is a block diagram of one embodiment of the elements in a repairer process.

FIG. 17 is a block diagram of one embodiment of the elements in a repairer process.

Figure 18A:
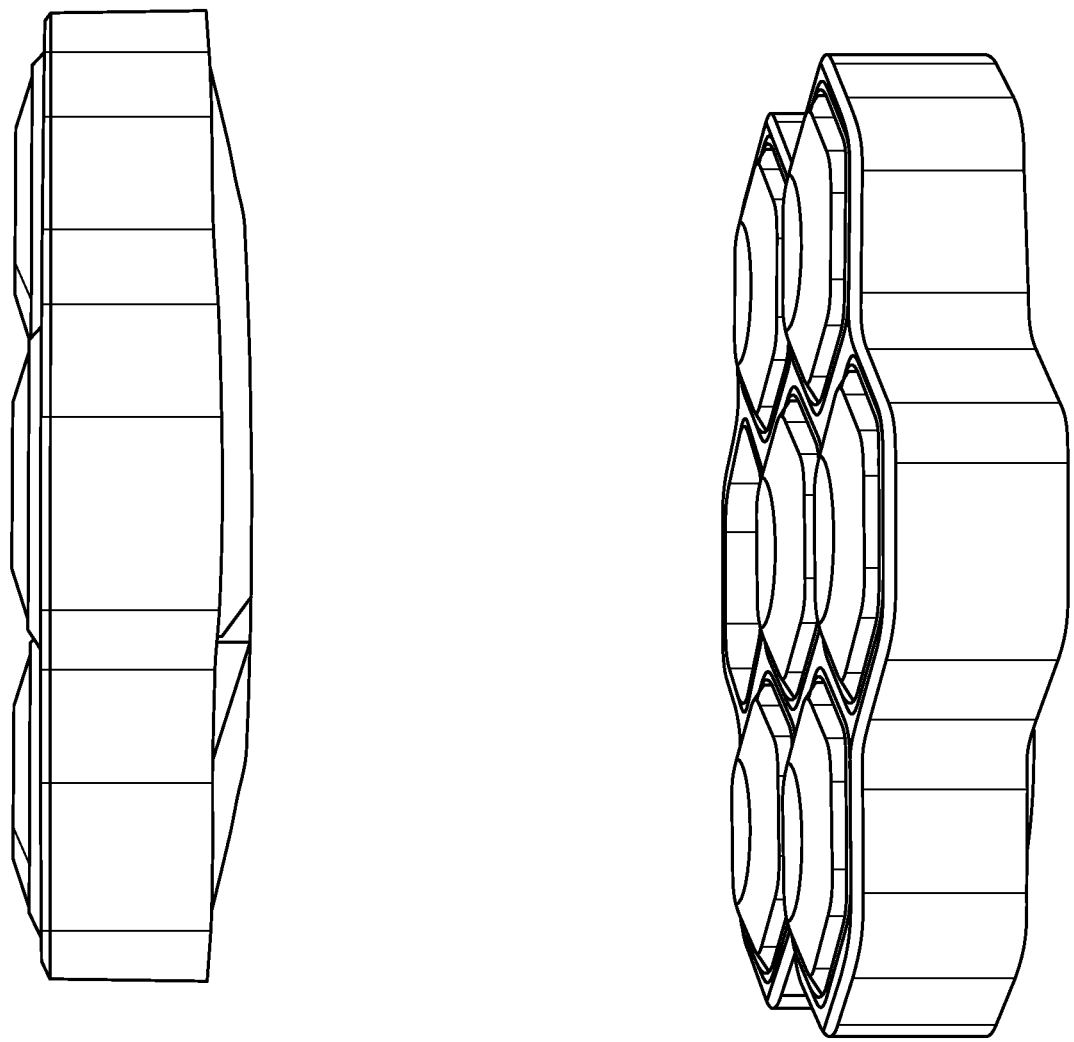
FIGS. 18A and 18B are diagrams showing one embodiment of a charging station extruding a charger.
Figure 18B:
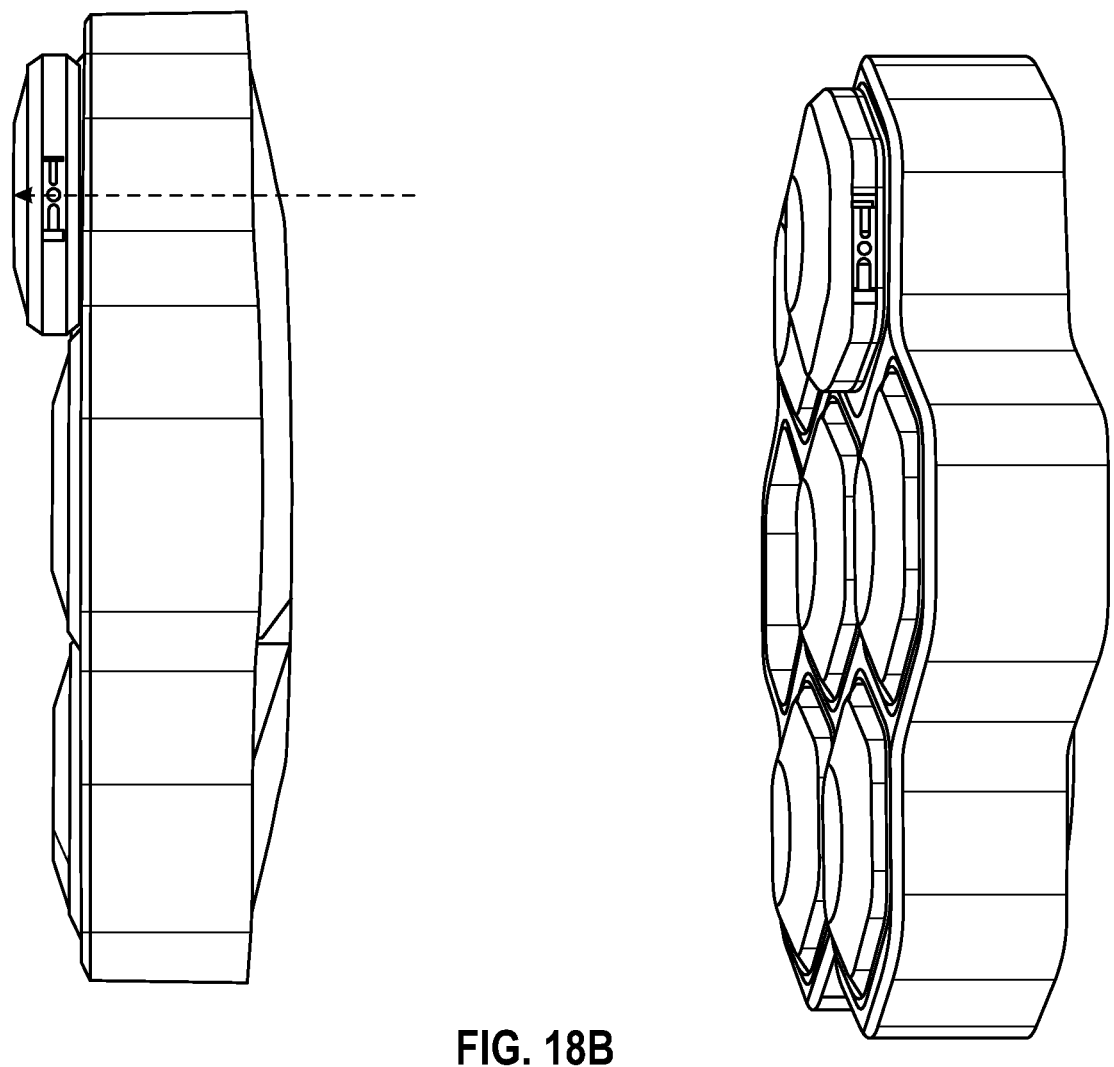

FIGS. 18A and 18B are diagrams showing one embodiment of a charging station extruding a charger. FIG. 18A illustrates a side view and a slight perspective view of the charging station, with the chargers in their nests. FIG. 18B illustrates a side view and a slight perspective view of the same charging station, with one charger partially ejected showing that the charger remains safely within the nest, but sufficiently extruded from the charging station to enable easy pickup by a user.

Figure 18C:
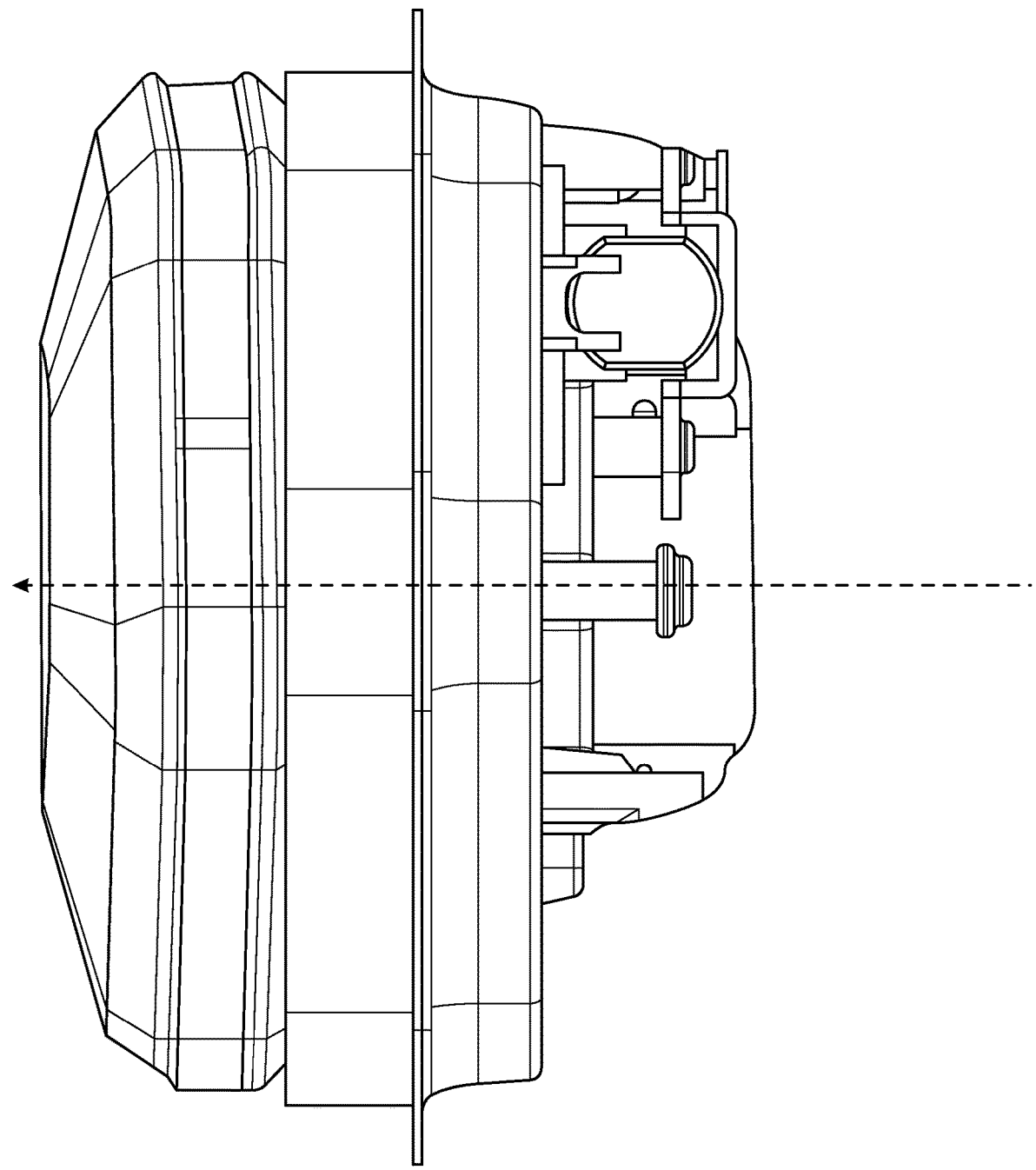
FIG. 18C illustrates one embodiment of the nest structure used to extrude the charger.

FIG. 18C illustrates one embodiment of the nest structure used to extrude the charger. The inside of the cup of the nest pushes up, to shift the nest outward.

Figure 19:
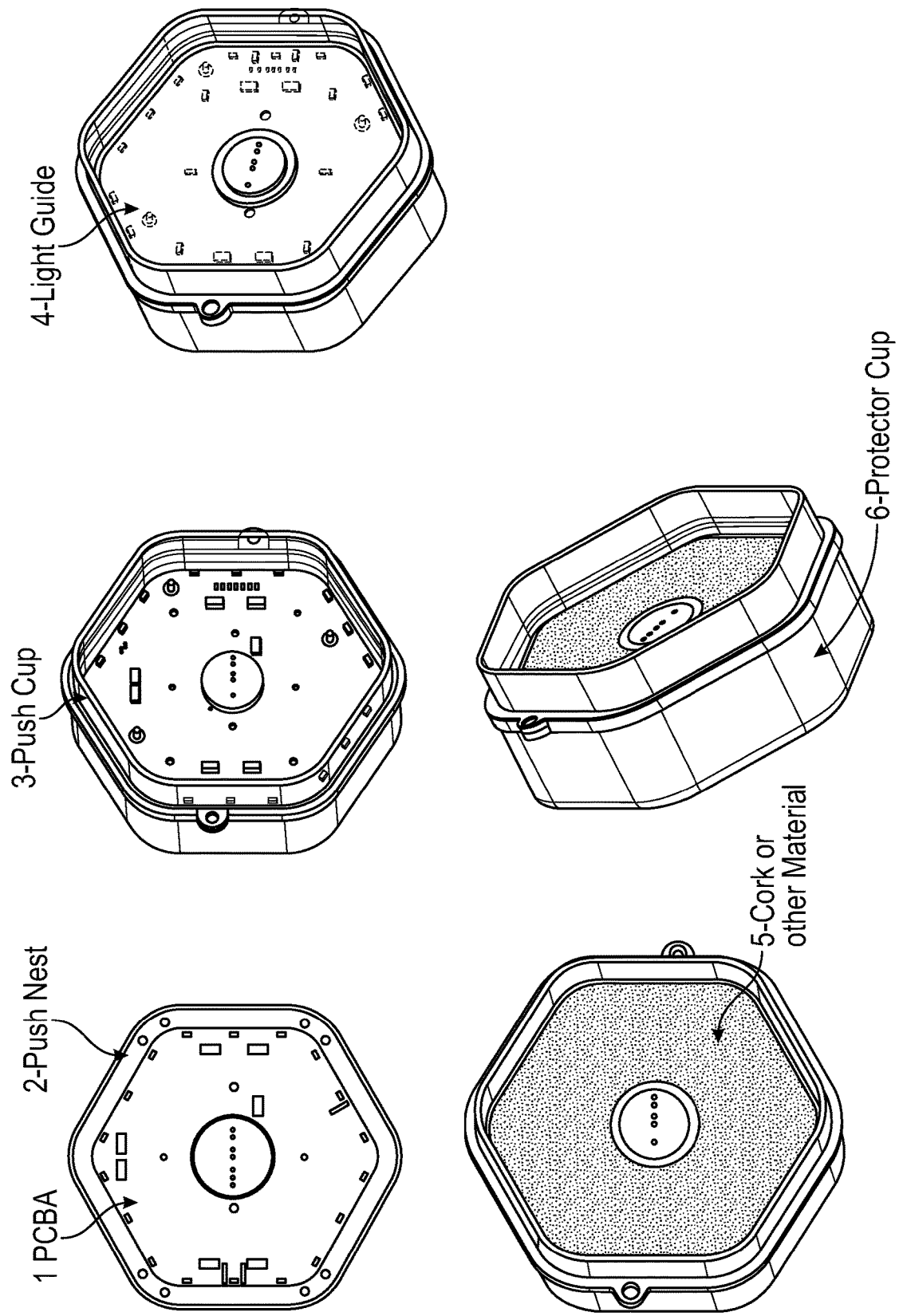
FIG. 19 illustrates one embodiment of the components of the nest structure.

FIG. 19 illustrates one embodiment of the components of the nest structure. The components include a printed circuit board (PCB), and a push element, shown in more detail in FIG. 20A-20B. The charger rests in a push nest component, which is pushed outward by the nest, when the charger is being extruded. In one embodiment, the PCB includes a multiprocessor enabling the charger to provide smart charging, light up, and be turned on and off as discussed above. In one embodiment, the nest is surrounded by a light guide. The light guide enables the nest to light up in various ways as discussed above. In one embodiment, a cork or other supportive material is placed in the nest. The outside is the protective cup.

Figure 20B:
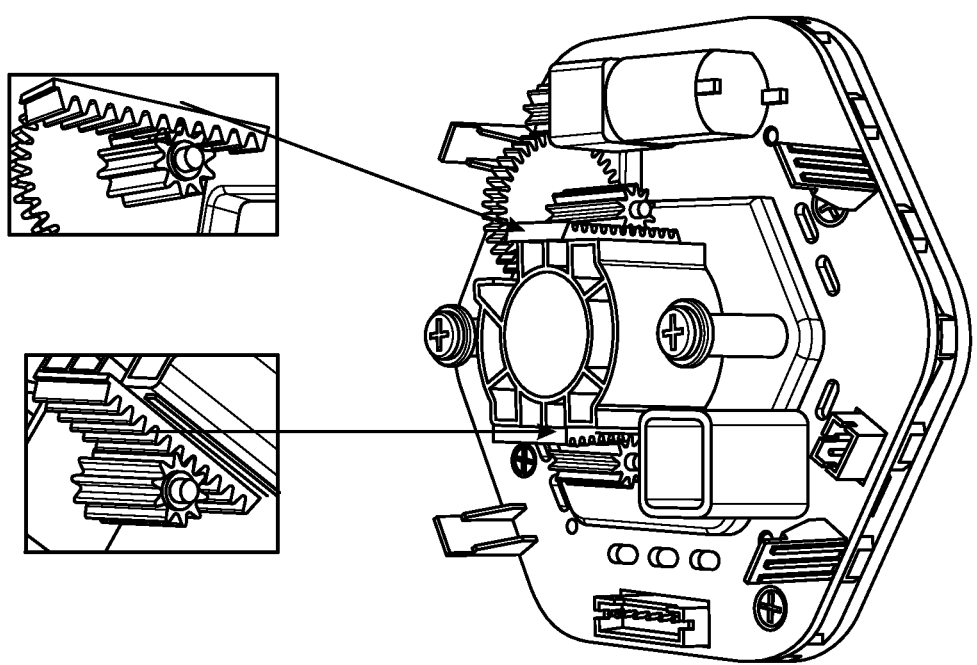
FIG. 20A-20B illustrates one embodiment of the gearing used for extruding the charger from the nest.
Figure 20A:
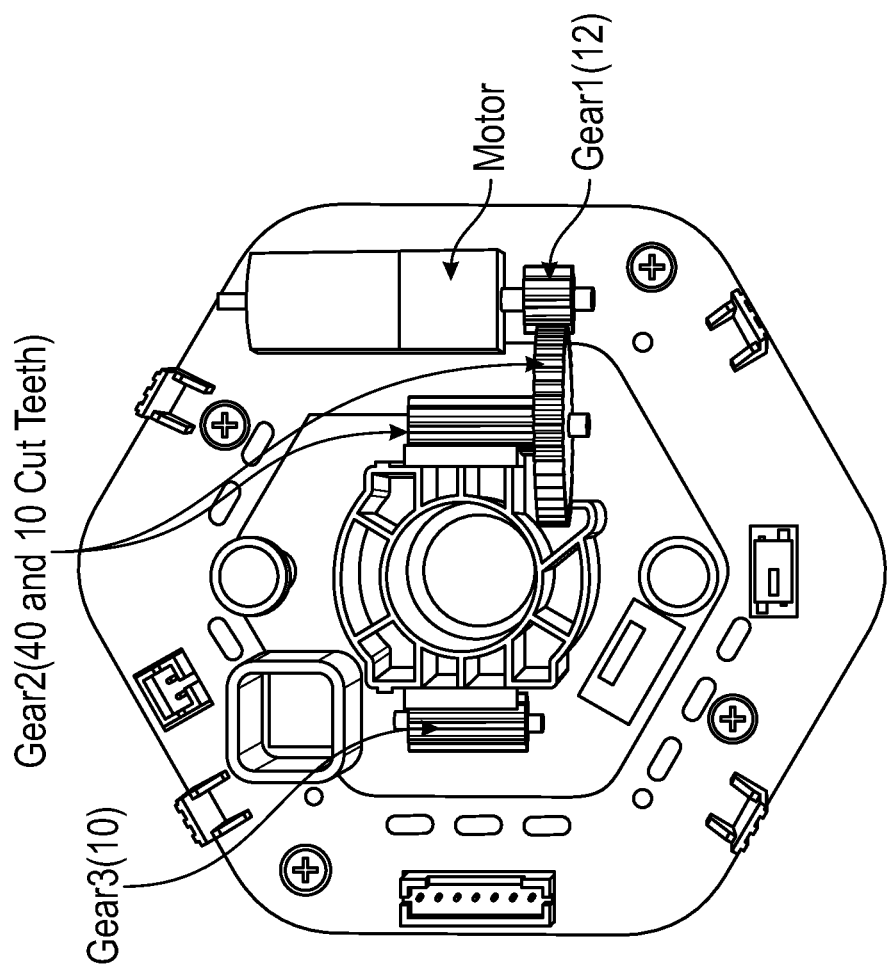

FIG. 20A-20B illustrates one embodiment of the gearing used for extruding the charger from the nest. In one embodiment, the push nest component is moved using gears. In one embodiment, as shown in FIGS. 20A and 20B a single motor is used to turn gears to move the center push element outward, to move out the charger. In one embodiment, ejection distance is limited, to ensure that the push cup does not fall out of the charging station. In one embodiment, the ejection distance is limited by two screws that hold the push cup.

Figure 21A:
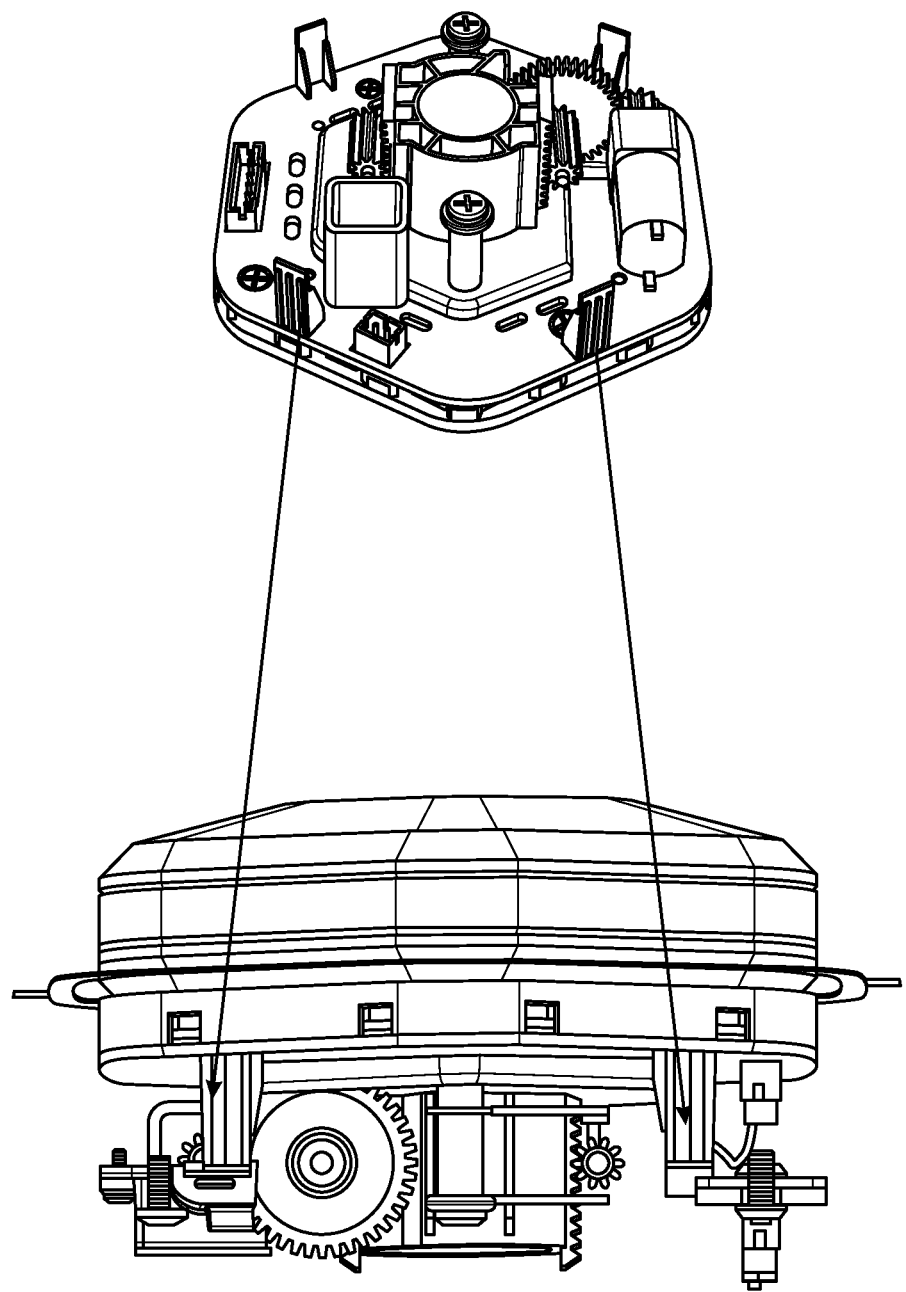
FIG. 21A-21B illustrate one embodiment of the gearing from a side view.
Figure 21B:
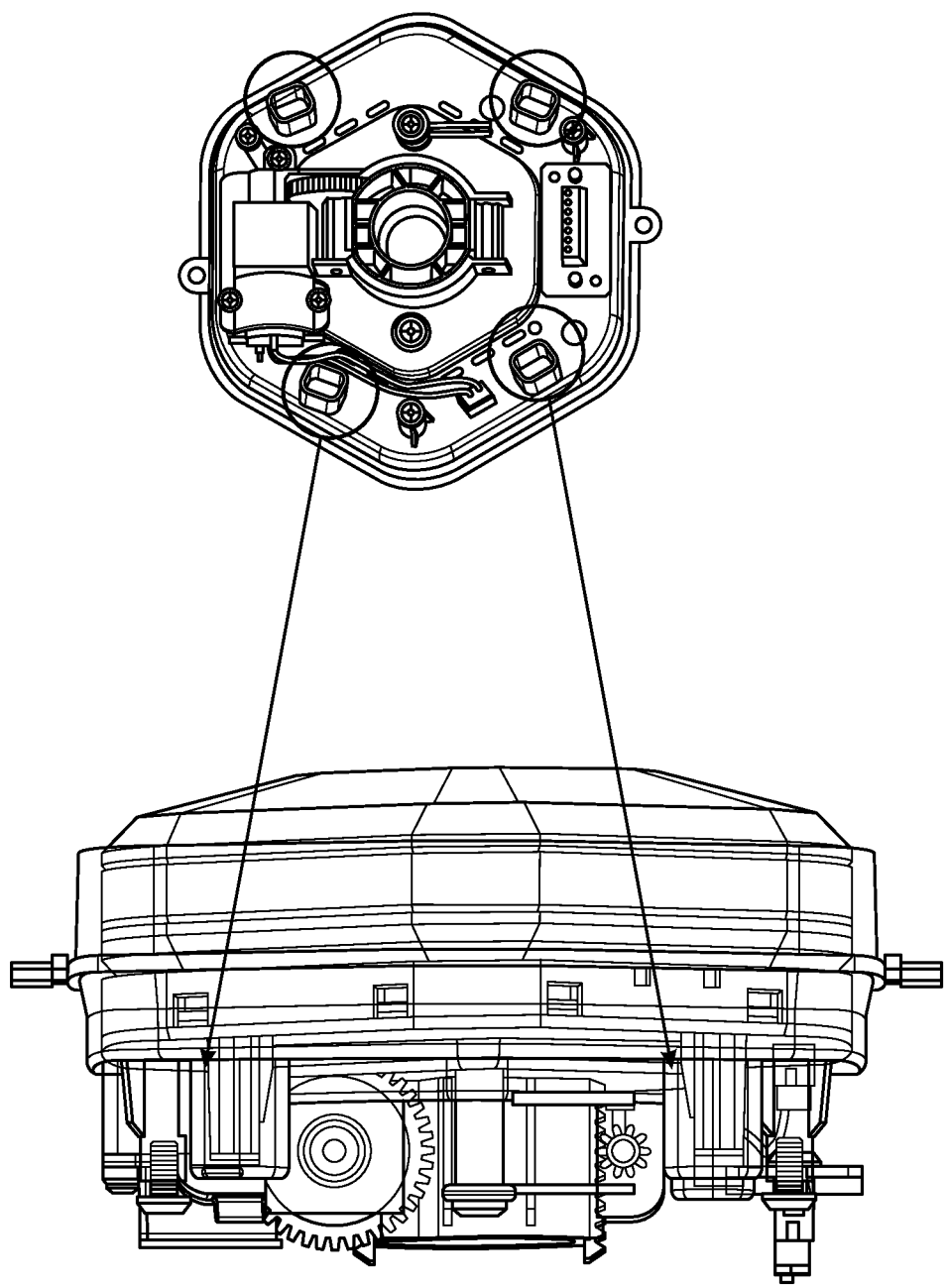

FIG. 21A-21B illustrate one embodiment of the gearing from a side view. The figure illustrates how the charger, resting on the push nest is pushed up, by the gearing. FIG. 21C illustrates a side view of nest component showing the light strip of LEDs and a guide. The LEDs in one embodiment, include 18 RBG LEDs, enabling the nest to light up in all colors. In one embodiment, the LEDs are placed symmetrically with three LED per side, one on each corner, and one in the middle. This allows the nest display to have even light. In one embodiment, the LEDs are positioned to direct light toward the front of the nest/side, not up. In one embodiment, the light guide enables the light to be directed outward.

Figure 21D:
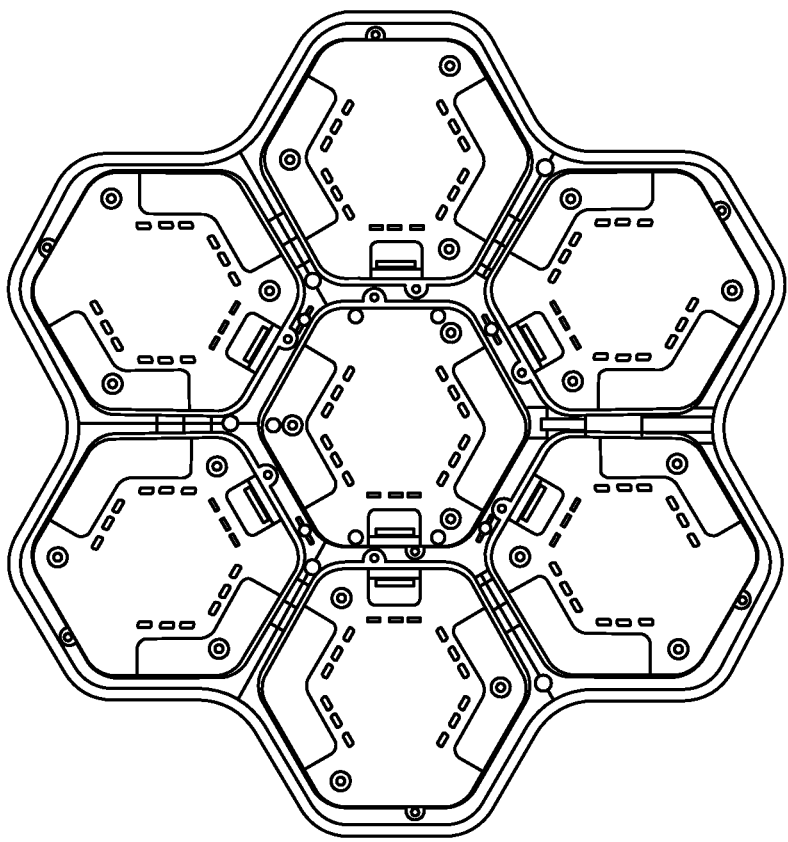
FIG. 21D illustrates the seven identical nests with nest lock and ejection elements for each of the nests.
Figure 21C:
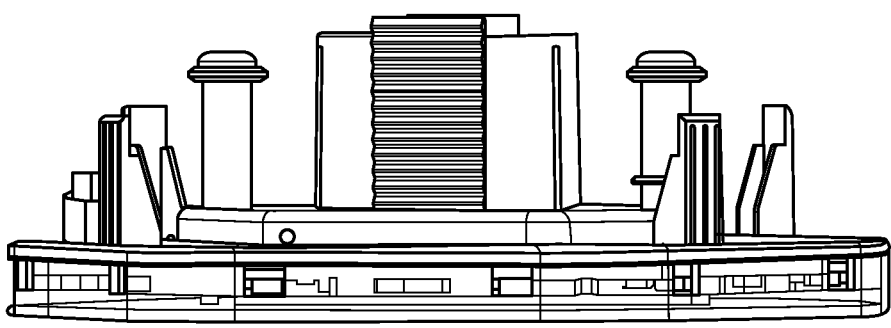
FIG. 21C illustrates one embodiment of a side view of a nest, showing the LEDs.

FIG. 21D illustrates the assembled charging station, with seven identical nest elements. Because the nest elements are consistent and simple, the system may be used to assemble a large number of charging stations.

Figure 22A:
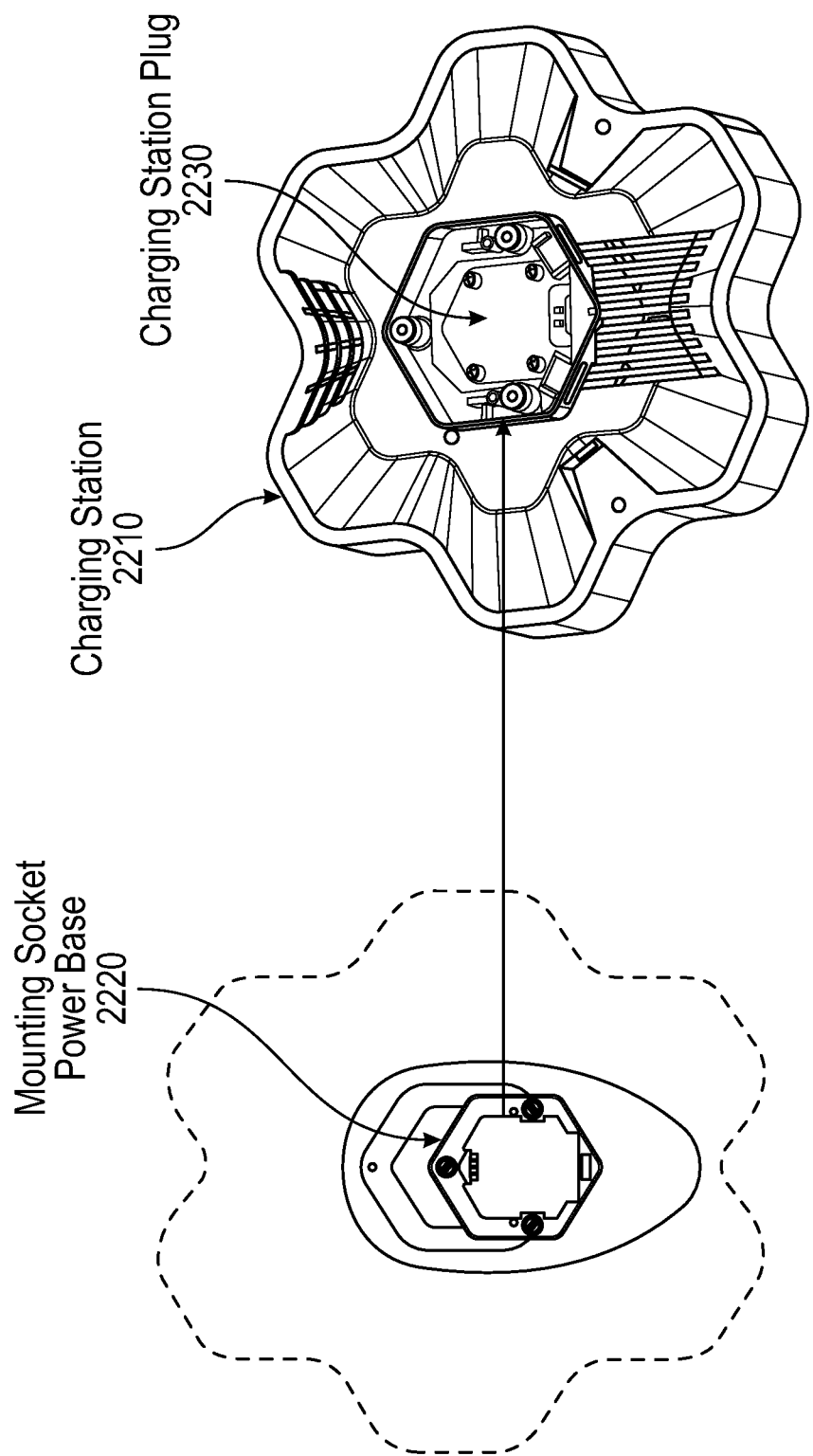
FIG. 22A illustrates one embodiment of attaching an indoor charging unit to a wall.

FIG. 22A illustrates one embodiment of attaching an indoor charging unit to a wall. The mounting socket power base 2220 is attached to a surface that will support the charging station 2210. The charging station 2220 has a charging station plug 2230, which is attached to the mounting socket power base 2220 by sliding onto it. Because of the design, the two elements are easy to assemble to each other. Additionally, this single connection provides power and data, in one embodiment. In another embodiment, the charging station 2210 may receive data through a wireless connection. In one embodiment, the alarm is placed inside the mount.

Figure 22B:
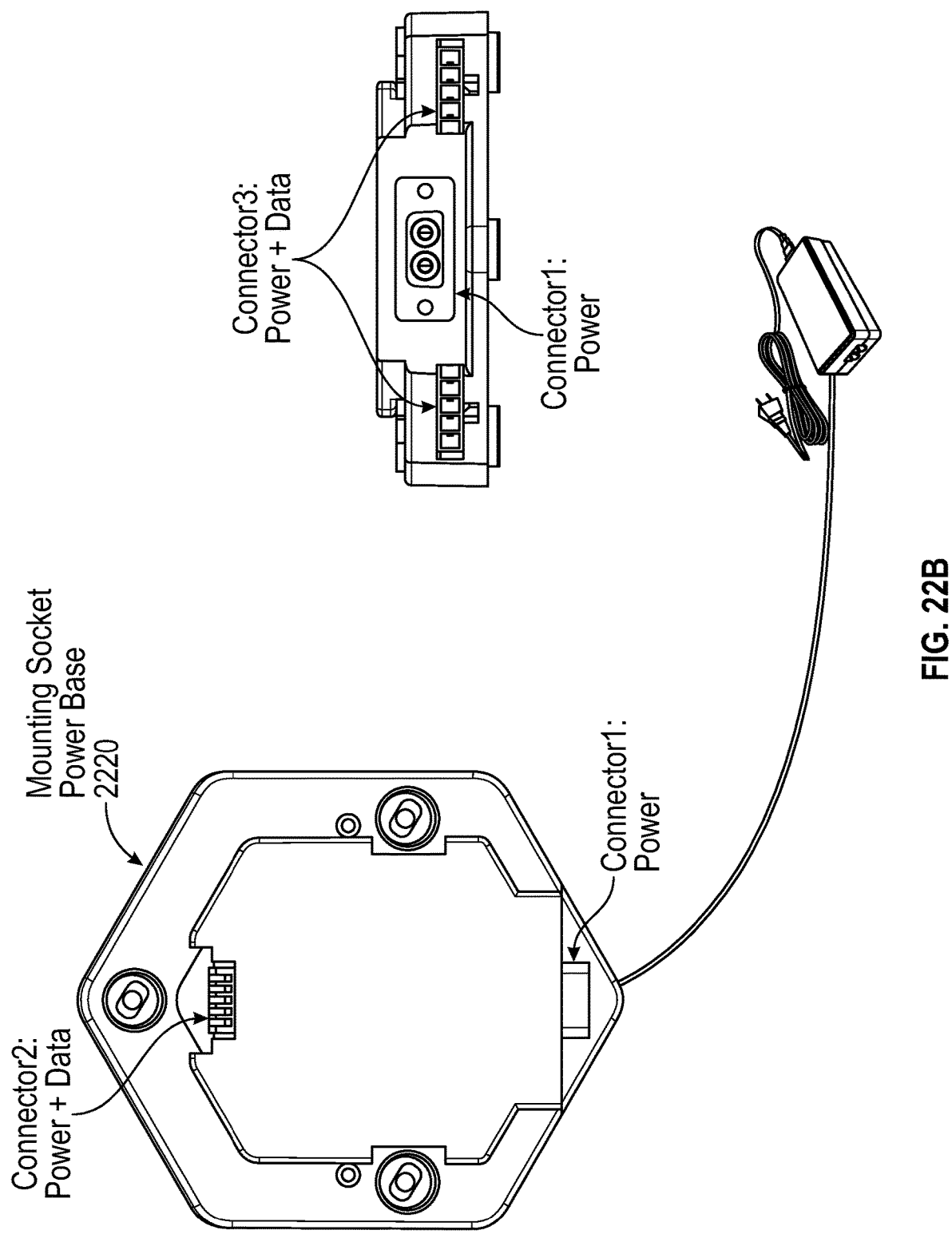
FIG. 22B illustrates one embodiment of the mounting socket/power base.

FIG. 22B illustrates one embodiment of the mounting socket power base. In one embodiment, the mounting socket power base 2220 has three points of connection to a surface. It has a power connection, and data connection. In one embodiment, connector 1 accepts an AC-power brick which provides power to the mounting socket power base 2220. Connector 2 is the connector to the charging station (not shown). Connector 3 is the connector to another mounting socket power base, in a multi-station arrangement. In one embodiment, two mounting socket power bases may be coupled to a mounting socket power base.

Figure 22C:
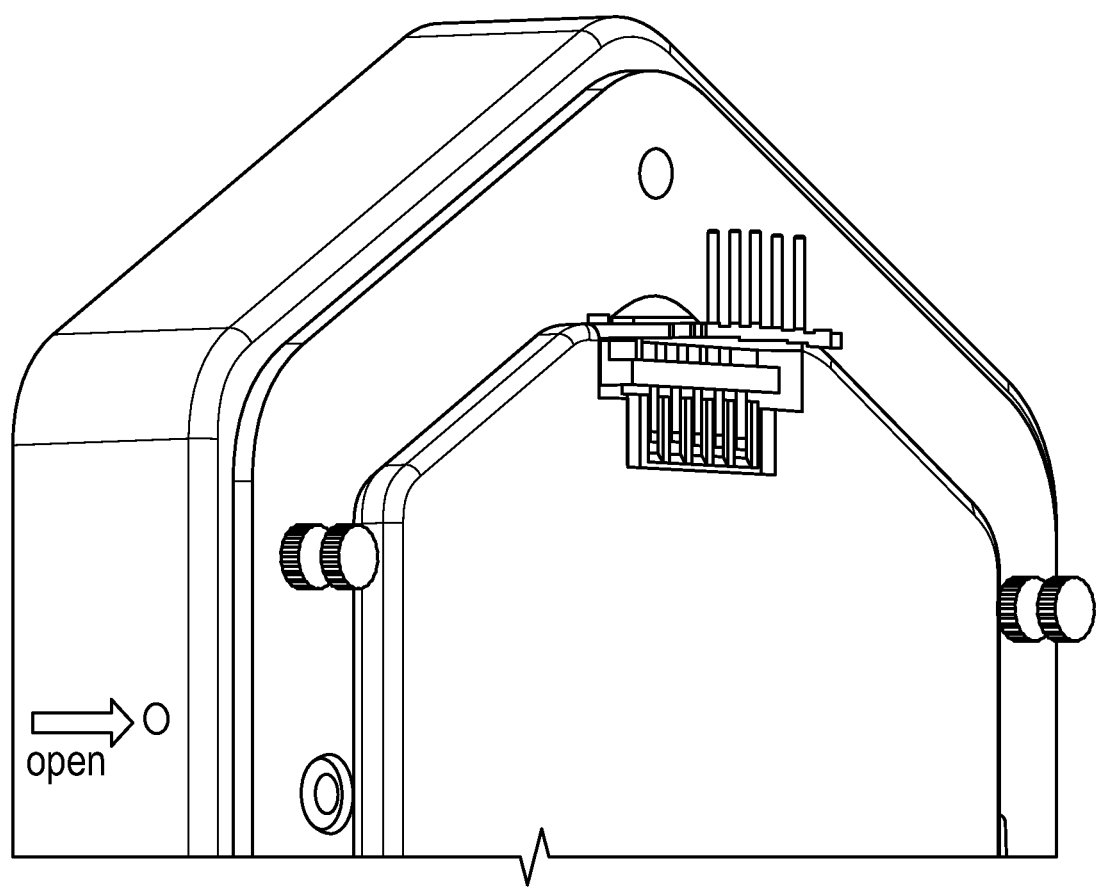
FIG. 22C illustrates one embodiment of the connector from a different angle.

FIG. 22C illustrates the connector 2 from a different angle, showing that it includes a plurality of stiff wires, which couple into the charging station's plug 2230.

Figure 22D:
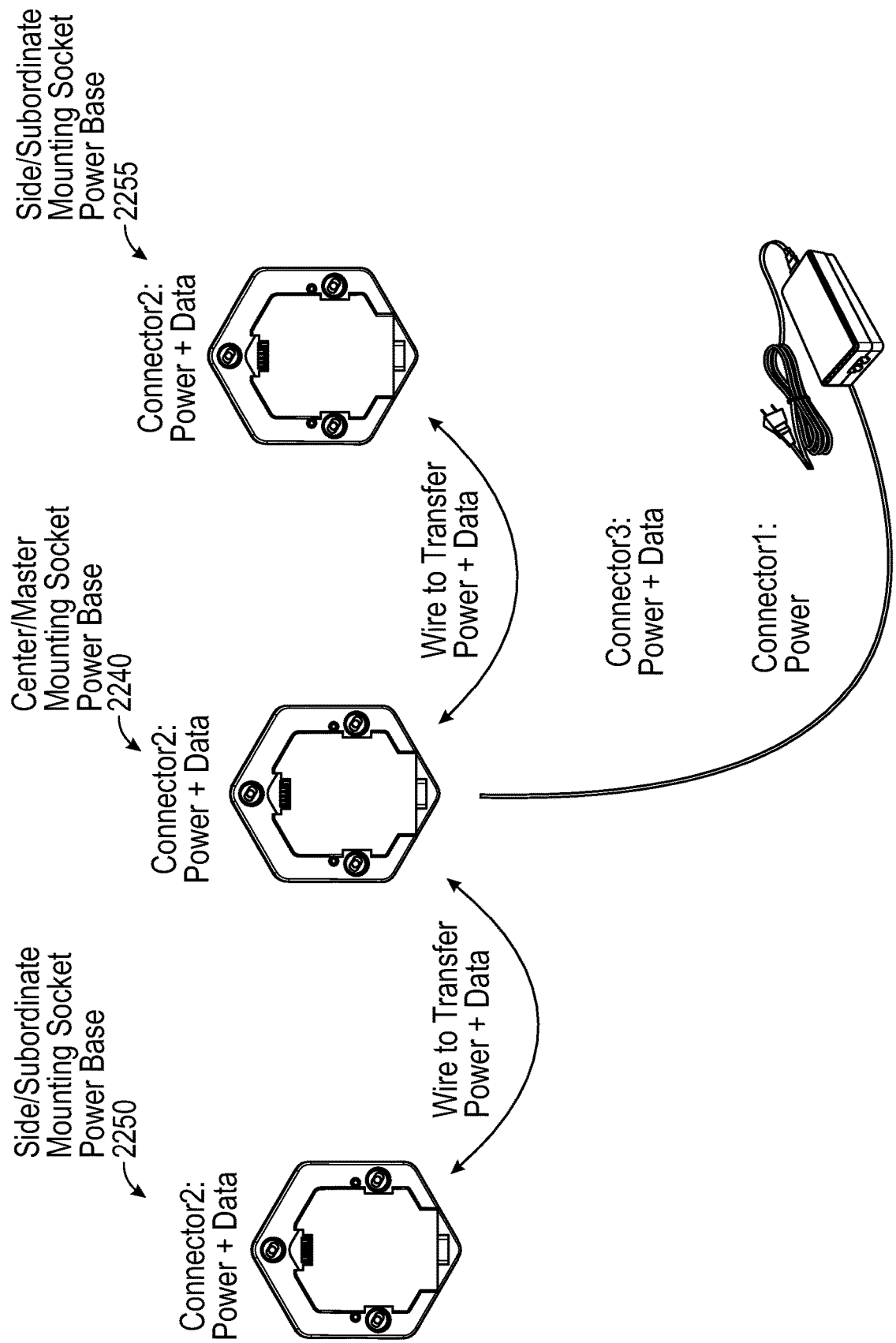
FIG. 22D illustrates one embodiment in which multiple mounting socket power bases may be coupled.

FIG. 22D illustrates one embodiment in which multiple mounting socket power bases may be coupled. In one embodiment, in a multi-charger station configuration, a single mounting socket power base is the "master" device which provides power and data to other devices coupled to it. The master mounting socket power base (here center mounting socket power base 2240) may have two subordinate mounting socket power bases 2250, 2255 coupled to it. Each of the side/subordinate mounting socket power bases 2250, 2255, may in turn be coupled to one further mounting socket power base. In one embodiment, this allows any number of mounting socket power bases to be chained. Practically, in one embodiment, no more than eight such bases should be chained with a single power supply.

Figure 23:
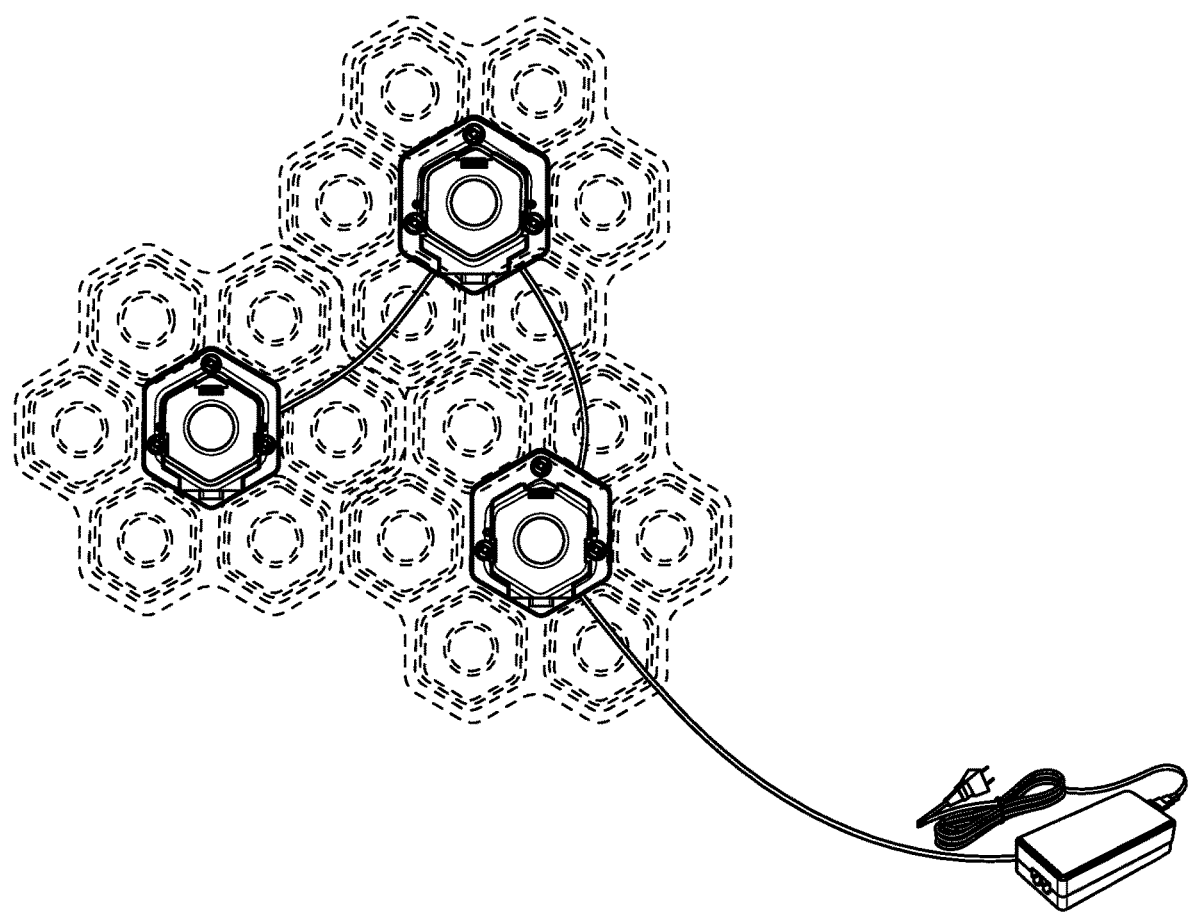
FIG. 23 illustrates one embodiment of the arrangement of the interconnected charging stations in a single venue.

FIG. 23 illustrates one embodiment of the arrangement of the interconnected charging stations in a single venue. In one embodiment, for installation the three mounting socket power base are installed in the pre-arranged relationship. In one embodiment, a template may be used, which defines the relationship between the mounting socket power bases. Once the mounting socket power bases are installed, cords may be used, to connect the subordinate mounting socket power bases to the master device. The master device may be set up for data communication. In one embodiment, the master device may receive an Internet connection via an ethernet cable or a similar device. The charging stations may then be slipped onto each of the mounting socket power bases. The charging stations are then in close proximity, and connected to power, and network.

In one embodiment, the master device may set up an internet connection using the cellular network or wireless network. In one embodiment, only the master device in any set of charging stations communicates with the server. The master device receives reports from the subordinate devices, and reports data from its own systems and from the subordinate devices as well.

Of course, though many of the processes in this application are shown as flowcharts, in some embodiment the processes shown are implemented as an interrupt-driven processes. Additionally, when the process stages are not dependent on each other their ordering is arbitrary. Furthermore, unless specifically indicated, the processes may be varied, or skipped, depending on the setup being used, and the limitations and capabilities of the systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A charger system comprising:
   a charging station including a plurality of nests, each nest configured to receive and eject a removeable charger;

each of the plurality of nests comprising a nest lock to lock in the charger;
the charger system interacting with a user account, enabling a user to request the charger;
upon receiving an authorized request, the nest configured to unlock and partially eject the charger.

2. The charger system of claim 1, wherein the nest lock ejects the charger so that it extends from the charging station, but remains securely within the nest until the user removes the charger.

3. The charger system of claim 1, wherein the charger is locked when it is within the nest, such that a charger forcibly removed from the charging station is non-functional.

4. The charger system of claim 1, wherein the charging station comprises an indoor charging station including a plurality of visible nests, designed for use within a location.

5. The charger system of claim 1, wherein the charging station comprises an outdoor charging station, fully enclosed including a door through which the nest ejects the charger.

6. The charger system of claim 1, wherein the charging station comprises an in-vehicle charging station, designed for use within a vehicle.

7. The charger system of claim 1, further comprising:
a server communicating with the charging station via a network, the server for controlling the charging station and the user account.

8. The charger system of claim 1, wherein the user account is accessed via:
a web application accessible by a user mobile device, an application on the user mobile device, and a web page accessible by the user mobile device.

9. The charger system of claim 1, further comprising:
a plurality of charging stations in a plurality of locations, wherein a charger obtained from any one charging station may be returned to any charging station that has an open nest.

10. The charger system of claim 1, wherein a business may control one or more charging stations, wherein the business shares revenue from the user for using the charger.

11. The charger system of claim 1, further comprising:
the charger including a sensor to detect opening of the charger or damaging of the charger.

12. The charger system of claim 1, further comprising:
the charging station including a magic light that indicates the charger that has maximum charging capacity, upon request from the user.

13. The charger system of claim 1, further comprising:
the user account further to enable the user to reserve a charger or a nest for returning the charger at a charging station in a particular location.

14. The charger system of claim 1, wherein the charger comprises:
a battery to provide charge;
a connection to enable the battery to be coupled to a user device; and
a suction cup designed to attach to the user's device, while the user device is being charged.

15. The charger system of claim 14, wherein the charger, when attached is configured to act as a kickstand for the user device, enabling the user device to be propped up for comfortable viewing.

16. The charger system of claim 1, further comprising:
the charger including a processor, such that the charger is disabled by a command from the charging station, when the charger is in the nest.

17. The charger system of claim 16, wherein the charger is enabled when the authorized request is approved, and the charger is partially ejected for the user, such that a charger removed without the authorized request is not functional.

18. The charger system of claim 1, further comprising:
a mounting socket power base attached to a surface, wherein the mounting socket power base provides power and data to the charging station, and the charging station is coupled to the mounting socket power base.

19. The charger system of claim 1, further comprising:
providing an ecosystem of a plurality of charging stations in a plurality of locations, such that a charger may be taken from any of the plurality of charging stations, and returned to any of the plurality of charging stations.

20. A charging station eco-system comprising:
a server to administer the charging station eco-system;
a plurality of charging stations in a plurality of venues, wherein one or more of the venues administer the charging stations in their venue, each of the plurality of charging stations including a plurality of removable chargers, each of the plurality of charging stations connecting to the server;
a user application available on a user device, to subscribe to the charging station eco-system, the user application enabling obtaining of the removable chargers and returning of the removable chargers, the user application connecting to the server;
the eco-system enabling a user to identify a charging station and request a charger, verifying the request by the server, and instructing the charging station to partially eject the charger in response to the request, and track usage of the charger by the user, for billing.

* * * * *